United States Patent
Wanner et al.

(10) Patent No.: US 11,305,876 B2
(45) Date of Patent: Apr. 19, 2022

(54) AIRCRAFT CABIN APPARATUS INCLUDING PERSONAL ELECTRONIC DEVICE HOLDER

(71) Applicant: Rockwell Collins, Inc., Cedar Rapids, IA (US)

(72) Inventors: Jackson R. Wanner, Winston-Salem, NC (US); David A. Richardson, Winston-Salem, NC (US); Rafael Z. Ramos, Winston-Salem, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 512 days.

(21) Appl. No.: 16/031,664

(22) Filed: Jul. 10, 2018

(65) Prior Publication Data
US 2020/0017220 A1    Jan. 16, 2020

(51) Int. Cl.
*B64D 11/06* (2006.01)
*B64D 11/00* (2006.01)

(52) U.S. Cl.
CPC .... *B64D 11/0638* (2014.12); *B64D 11/00155* (2014.12); *B64D 11/0636* (2014.12)

(58) Field of Classification Search
CPC .......... B64D 11/0638; B64D 11/00155; B64D 11/0636
USPC .................................................. 108/25–26.2
See application file for complete search history.

(56) References Cited

U.S. PATENT DOCUMENTS

| 3,176,947 A * | 4/1965 | Inverso | D06F 79/02 248/117.6 |
| 4,978,096 A | 12/1990 | Struckmann | |
| 5,745,565 A * | 4/1998 | Wakefield | B60R 11/0241 379/446 |
| 6,028,267 A * | 2/2000 | Byrne | H01R 13/518 174/55 |
| 6,553,919 B1 * | 4/2003 | Nevin | A47B 21/0073 108/25 |
| 7,073,449 B2 | 7/2006 | Pipkin | |

(Continued)

FOREIGN PATENT DOCUMENTS

EP    2962937 A1    1/2016

OTHER PUBLICATIONS

Search Report dated Dec. 6, 2019 for European Application No. 19185427.2.

Primary Examiner — Daniel J Troy
Assistant Examiner — Timothy M Ayres
(74) Attorney, Agent, or Firm — Suiter Swantz pc llo

(57) ABSTRACT

An apparatus for an aircraft cabin may include a body and a personal electronic device (PED) holder. The body may include a sloped surface between a top surface and a recess surface with a plurality of recess protrusions configured to support a PED. The body may be couplable to a surface within the aircraft cabin via one or more couplers. The PED holder may include a paddle and at least one hinge coupler. The paddle may be located opposite the sloped surface within the recess. The paddle may be dimensioned to fit within the recess when the PED holder is in a closed position. The paddle may be configured to support the PED when the PED holder is in an open position. The PED holder may be configured to rotate about an axis through the at least one hinge coupler between at least the open position and the closed position.

24 Claims, 17 Drawing Sheets

(56) References Cited

U.S. PATENT DOCUMENTS

| | | | |
|---|---|---|---|
| 7,668,309 B2 * | 2/2010 | Wilcox | H04M 1/04 |
| | | | 379/455 |
| 7,735,644 B2 * | 6/2010 | Sirichai | A45F 5/02 |
| | | | 206/320 |
| 7,923,964 B2 | 4/2011 | Lin et al. | |
| 8,134,216 B2 * | 3/2012 | Spencer | G21H 1/02 |
| | | | 257/428 |
| 8,312,991 B2 * | 11/2012 | Diebel | A45C 13/005 |
| | | | 206/45.24 |
| 8,369,082 B2 | 2/2013 | Madonna et al. | |
| 8,624,547 B2 | 1/2014 | Thorsell et al. | |
| 8,667,904 B2 | 3/2014 | Pajic | |
| 8,826,830 B2 | 9/2014 | Pajic | |
| 9,067,682 B2 | 9/2015 | Pajic | |
| 9,156,555 B2 * | 10/2015 | Shih | H05K 7/18 |
| 9,167,905 B2 | 10/2015 | Pajic | |
| 9,168,876 B2 | 10/2015 | Pajic | |
| 9,242,733 B2 | 1/2016 | Pajic | |
| 9,403,596 B2 | 8/2016 | Pajic | |
| 9,409,647 B2 | 8/2016 | Pajic | |
| 9,481,465 B2 | 11/2016 | Pajic | |
| 9,623,971 B2 | 4/2017 | Pajic | |
| 9,701,234 B2 | 7/2017 | Pajic | |
| 9,758,249 B2 * | 9/2017 | Zheng | B64D 11/06 |
| 9,796,344 B2 | 10/2017 | Pajic | |
| 10,273,009 B2 * | 4/2019 | Fishel | A47B 23/001 |
| 10,696,408 B2 * | 6/2020 | Miedema | B60N 3/002 |
| 2005/0178297 A1 | 8/2005 | Pipkin | |
| 2007/0283855 A1 | 12/2007 | Pozzi | |
| 2009/0020450 A1 * | 1/2009 | Heneghan | B60N 3/002 |
| | | | 206/567 |
| 2009/0174209 A1 | 7/2009 | Lota et al. | |
| 2010/0183814 A1 * | 7/2010 | Rios | C08J 7/046 |
| | | | 427/387 |
| 2010/0315041 A1 | 12/2010 | Tan | |
| 2012/0083153 A1 | 4/2012 | Schmidt | |
| 2013/0206782 A1 * | 8/2013 | Lee | B60N 3/101 |
| | | | 220/737 |
| 2013/0277529 A1 * | 10/2013 | Bolliger | F16M 13/00 |
| | | | 248/676 |
| 2013/0314861 A1 * | 11/2013 | Burford | B60N 3/004 |
| | | | 361/679.01 |
| 2014/0015289 A1 | 1/2014 | Fan | |
| 2014/0124641 A1 * | 5/2014 | Kassanoff | A47B 23/04 |
| | | | 248/447 |
| 2015/0020715 A1 | 1/2015 | Pajic | |
| 2015/0291073 A1 | 10/2015 | Pajic | |
| 2016/0023618 A1 | 1/2016 | Pajic | |
| 2016/0023766 A1 | 1/2016 | Pajic | |
| 2016/0039525 A1 | 2/2016 | Pajic | |
| 2016/0059795 A1 * | 3/2016 | Rook | B60N 2/0232 |
| | | | 108/25 |
| 2016/0114891 A1 | 4/2016 | Pajic | |
| 2016/0298808 A1 | 10/2016 | Boyer | |
| 2017/0060186 A1 | 3/2017 | Eliyahu | |
| 2017/0166141 A1 | 6/2017 | Pajic | |
| 2017/0217349 A1 | 8/2017 | Pajic | |
| 2017/0305321 A1 | 10/2017 | Pajic | |
| 2018/0043841 A1 | 2/2018 | Pajic | |
| 2018/0072424 A1 * | 3/2018 | Irons | B64D 11/00152 |
| 2018/0258031 A1 * | 9/2018 | Ries | C07D 307/58 |

* cited by examiner

AIRCRAFT CABIN APPARATUS INCLUDING PERSONAL ELECTRONIC DEVICE HOLDER

BACKGROUND OF THE INVENTION

Aircraft cabins typically include a seat back-mounted tray. Select seat back-mounted trays known in the art include a personal electronic device holder. These personal electronic device holders may segment the seat back-mounted tray, or otherwise prevent the seat back-mounted tray from including a smooth surface. In addition, these personal electronic device holders may not be self-closing when returning the seat back-mounted tray to an upright position via a linkage assembly, creating a risk for the possible damaging of the seat back-mounted tray or components of the seat back-mounted tray, the seat to which the personal electronic device holder is coupled, and/or the user utilizing the personal electronic device holder. Further, these personal electronic device holders may include a clamp or slot that engages the personal electronic device, such that the personal electronic device holder may be limited to select size, shape, and/or configuration of the personal electronic devices.

SUMMARY

In one aspect, the inventive concepts disclosed herein are directed to an aircraft cabin apparatus including a personal electronic device holder. The apparatus may include a body. The body may include a top surface. The body may include a recess. The recess may include a recess surface. The recess surface may include a plurality of recess protrusions configured to support a personal electronic device. The body may include a sloped surface between the top surface and the recess surface. The body may be couplable to a surface within the aircraft cabin via one or more couplers. The apparatus may include a personal electronic device holder. The personal electronic device holder may include a paddle located opposite the sloped surface within the recess. The paddle may be dimensioned to fit within the recess when the personal electronic device holder is in a closed position. The paddle may be configured to support the personal electronic device when the personal electronic device holder is in an open position. The personal electronic device holder may include at least one hinge coupler coupled to the paddle. The personal electronic device holder may be configured to rotate about an axis through the at least one hinge coupler between at least the closed position and the open position.

In a further aspect, the inventive concepts disclosed herein are directed to an aircraft cabin apparatus including a personal electronic device holder. The apparatus may include a body. The body may include a top section. The top section may include a top surface. The body may include a bottom section. The body may include a cavity defined by at least an interior surface of the top section and an interior surface of the bottom section. The body may include a recess. The recess may include a recess surface. The recess surface may include a plurality of recess protrusions configured to support a personal electronic device. The body may include a sloped surface between the top surface and the recess surface. The body may be couplable to a surface within the aircraft cabin via one or more couplers. The apparatus may include a personal electronic device holder. The personal electronic device holder may include a paddle located opposite the sloped surface within the recess. The paddle may be dimensioned to fit within the recess when the personal electronic device holder is in a closed position. The paddle may be configured to support the personal electronic device when the personal electronic device holder is in an open position. The personal electronic device holder may include at least one hinge coupler attached to the paddle. The personal electronic device holder may be configured to rotate about an axis through the at least one hinge between at least the open position and the closed position. The personal electronic device holder may include a tab attached to the at least one hinge coupler. The tab may be inserted within the cavity. The tab may be configured to prevent rotation of the personal electronic device holder in a selected direction when the tab makes contact with the bottom interior surface of the top section.

In a further aspect, the inventive concepts disclosed herein are directed to an aircraft cabin apparatus including a personal electronic device holder. The apparatus may include a body. The body may include a top surface. The body may include a recess. The recess may include a recess surface. The recess surface may include a plurality of recess protrusions configured to support a personal electronic device. The body may include a spring-damper assembly. The body may include a sloped surface between the top surface and the recess surface. The body may be couplable to a surface within the aircraft cabin via one or more couplers. The apparatus may include a personal electronic device holder. The personal electronic device holder may include a paddle located opposite the sloped surface within the recess. The paddle may be dimensioned to fit within the recess when the personal electronic device holder is in a closed position. The paddle may be configured to support the personal electronic device when the personal electronic device holder is in an open position. The personal electronic device holder may include at least one hinge coupler coupled to the paddle. The personal electronic device holder may be configured to rotate about an axis through the at least one hinge coupler between at least the closed position and the open position. The at least one hinge coupler may be coupled to the spring-damper assembly. The spring-damper assembly may be configured to return the personal electronic device holder to the closed position when the paddle is not supporting the personal electronic device.

In a further aspect, the inventive concepts disclosed herein are directed to an aircraft cabin apparatus including a personal electronic device holder. The apparatus may include a body. The body may include a top surface. The body may include a recess. The recess may include a recess surface. The recess surface may include a plurality of recess friction contact pads configured to support a personal electronic device. The body may include a sloped surface between the top surface and the recess surface. The body may be couplable to a surface within the aircraft cabin via one or more couplers. The apparatus may include a personal electronic device holder. The personal electronic device holder may include a paddle located opposite the sloped surface within the recess. The paddle may be dimensioned to fit within the recess when the personal electronic device holder is in a closed position. The paddle may be configured to support the personal electronic device when the personal electronic device holder is in an open position. The personal electronic device holder may include at least one hinge coupler coupled to the paddle. The personal electronic device holder may be configured to rotate about an axis through the at least one hinge coupler between at least the closed position and the open position.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2A is an isometric view of an exemplary embodiment of an apparatus including a personal electronic device holder according to the inventive concepts disclosed herein.

FIG. 2B is an isometric view of an exemplary embodiment of an apparatus including a personal electronic device holder according to the inventive concepts disclosed herein.

DETAILED DESCRIPTION OF EXEMPLARY EMBODIMENTS

Figure 1A:
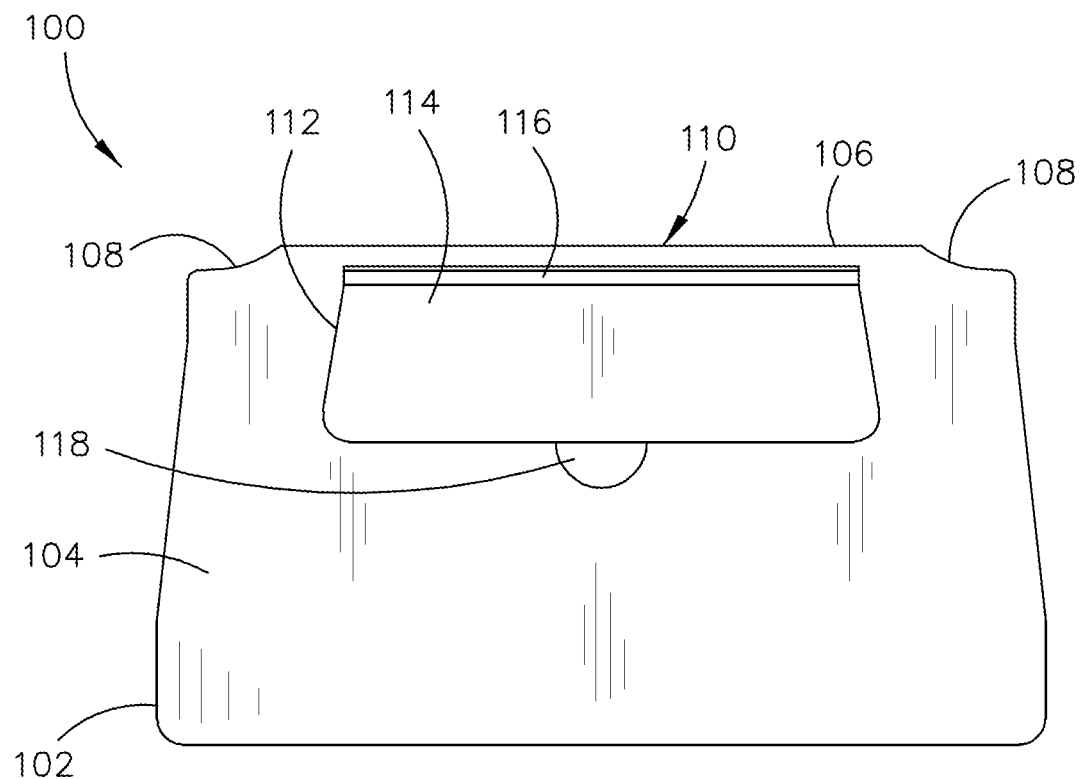
FIG. 1A is a top view of an exemplary embodiment of an apparatus including a personal electronic device holder according to the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

FIGS. 1A-10C generally illustrate exemplary embodiments of an apparatus including an aircraft cabin personal electronic device holder, according to the inventive concepts disclosed herein.

Broadly, embodiments of the inventive concepts disclosed herein are directed to an apparatus including an aircraft cabin personal electronic device holder. More particularly, embodiments of the inventive concepts disclosed herein are directed to an apparatus including an aircraft cabin personal electronic device holder, where the personal electronic device holder may be configured to be self-closing and may be configured to hold a personal electronic device in place.

Figure 1B:
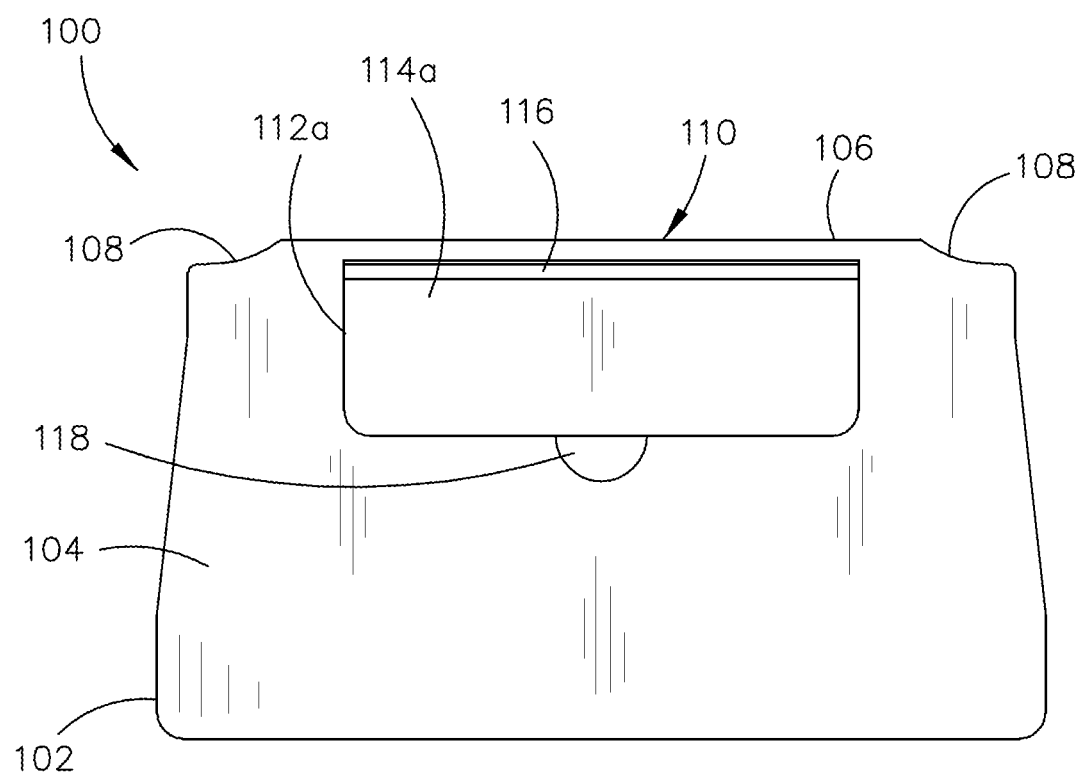
FIG. 1B is a top view of an exemplary embodiment of an apparatus including a personal electronic device holder according to the inventive concepts disclosed herein.

FIGS. 1A and 1B generally illustrate exemplary embodiments of an apparatus 100 including a personal electronic device holder, according to the inventive concepts disclosed herein.

The apparatus 100 may include a body. The body may include a top section 102. The top section 102 may include a top surface 104. The top surface 104 may include a perimeter of a selected shape. For example, the top surface 104 may include a free-form perimeter that is symmetric when split via a line through the long sides and/or the short sides of the top surface 104. By way of another example, the top surface 104 may include a rectangular (or substantially rectangular) perimeter. By way of another example, the top surface 104 may include a trapezoidal-shaped (or substantially trapezoidal-shaped) perimeter. It is noted herein a length of the top surface 104 may be defined as a distance between the long sides of the top section 102. In addition, it is noted herein a width of the top surface 104 may be defined as a distance between the short sides of the top section 102.

The body may include a rear surface 106. The rear surface 106 may include one or more cut-outs 108. The top section 102 may include a personal electronic device holder 110. It is noted herein that "personal electronic device holder 110", "PED holder 110", and "leaf 110" may be considered equivalent for purposes of the present disclosure.

The PED holder 110 may be positioned within the top surface 104 proximate to the rear surface 106. It is noted herein, however, that the PED holder 110 may be positioned any on within the top surface 104 including, but not limited to, a halfway point along the length of the top surface 104 from the rear surface 106. Therefore, the following description should not be interpreted as a limitation on the present disclosure but merely an illustration.

The PED holder 110 may include a paddle. The paddle may include a top paddle surface. The top paddle surface may include a perimeter of a selected shape. For example, as illustrated in FIG. 1A a paddle 112 may include a trapezoidal-shaped (or substantially trapezoidal-shaped) perimeter. By way of another example, as illustrated in FIG. 1B a paddle 112a may include a rectangular (or substantially rectangular) perimeter. By way of another example, the paddle may include a free-form perimeter that is symmetric when split via a line through the long sides and/or the short sides of the paddle.

It is noted herein that any description of the paddle 112 may be extended to the paddle 112a. In addition, it is noted herein that any description of the top paddle surface 114 may be extended to the top paddle surface 114a. Therefore, the following description should not be interpreted as a limitation on the present disclosure but merely an illustration.

It is noted herein a length of the top paddle surface 114 may be defined as a distance between the long sides of the paddle 112. In addition, it is noted herein a width of the top paddle surface 114 may be defined as a distance between the short sides of the paddle 112.

The paddle 112 may be coupled to the top section 102 via a hinge coupler 116. For example, the hinge coupler 116 may include a cylindrical tube, a u-shaped channel, or the like. The paddle 112 and the hinge coupler 116 may be a single component fabricated via one or more fabrication processes from a material including, but not limited to, a plastic or a metal. For example, the one or more fabrication processes may include, but are not limited to, molding (e.g., injection molding, compression molding, or the like), vacuum casting, thermoforming, 3D-printing, metal-casting, machining, cutting, folding, punching, shearing, stamping, or the like. The paddle 112 and the hinge coupler 116 may be separate components coupled together via one or more fabrication processes, an adhesive, one or more component-integrated fasteners, one or more secondary fasteners, or the like.

The paddle 112 may extend from the hinge coupler 116 along a tangent line from a point on an exterior surface of the hinge coupler 116. In this regard, the paddle 112 may extend from the hinge coupler 116 at an angle perpendicular (or substantially perpendicular) to a line through a width (e.g., diameter) of the hinge coupler 116. It is noted herein, however, that the paddle 112 may extend from the hinge coupler 116 at any angle ranging from parallel (or substantially parallel) to perpendicular (or substantially perpendicular) to the line through the width of the hinge coupler 116.

The PED holder 110 may be rotatable from a closed position to an open position about an axis through the hinge coupler 116. For example, the top paddle surface 114 may be flush (or substantially flush) with the top surface 104 (e.g., the top paddle surface 114 may be on a plane shared with the top surface 104) when the PED holder 110 is in the closed position. By way of another example, the top paddle surface 114 may be at an angle relative to the top surface 104 when the PED holder 110 is in the open position. For example, the angle relative to the top surface 104 may range from 0 degrees to 136 degrees.

The top paddle surface 114 may be of a selected length when the PED holder 110 is in the closed position (or height when the PED holder 110 is in the open position) relative to a length of the top surface 104. For example, the length of the top paddle surface 114 may be less than fifty percent of the length of the top surface 104. For instance, the length of the top paddle surface 114 may be twenty percent of the length of the top surface 104. By way of another example, the length of the top paddle surface 114 may be fifty percent of the length of the top surface 104. By way of another example, the length of the top paddle surface 114 may be greater the fifty percent of the length of the top surface 104. For instance, the length of the top paddle surface 114 may be equal (or substantially equal) to the length of the top surface 104. In this instance, the PED holder 110 may operate (e.g., is hinged) in a similar manner as a clamshell design.

The top paddle surface 114 may be of a selected width when the PED holder 110 is in the closed position relative to a width of the top surface 104 of the paddle 112. For example, the width of the top paddle surface 114 may be less than fifty percent of the width of the top surface 104. By way of another example, the width of the top paddle surface 114 may be fifty percent of the width of the top surface 104. By way of another example, the width of the top paddle surface 114 may be greater the fifty percent of the width of the top surface 104. For instance, the width of the top paddle surface 114 may be equal (or substantially equal) to the width of the top surface 104. In this instance, the PED holder 110 may operate (e.g., is hinged) in a similar manner as a clamshell design.

The top surface 104 may include one or more recesses 118 (e.g., notch, groove, indentation, or the like). For example, where the PED holder 110 is in the closed position, the one or more recesses 118 may be positioned within the top surface 104 proximate to a side of the paddle 112. For example, the one or more recesses 118 may be configured to receive a lifting tool (e.g., finger, stylus, pencil, pen, flat board, angled board, or the like), where the lifting tool may engage the PED holder 110 and rotate the PED holder 110 from the closed position to the open position. By way of another example, the one or more recesses 118 may be a selected shape including, but not limited to, at least a portion of a spherical cap, a wedge (e.g., triangular prism), a rectangular prism, or other polyhedron known in the art. By way of another example, the one or more recesses 118 may include an interior edge including, but not limited to, a sharp corner, a chamfered edge (e.g., sloped or angled edge), a filleted edge (e.g., rounded edge), or other types of edges known in the art.

The paddle 112 may include two or more sections. For example, the paddle 112 may include a main paddle section and an additional paddle section. For instance, the additional paddle section may include a telescopic section that may be raised when the PED holder 110 is in the open position, increasing the total height of the paddle 112. By way of another example, the additional paddle section may include a hinged section that may be rotated into position when the PED holder 110 is in the open position, increasing the total height of the paddle 112.

The top section 102 may be fabricated via one or more fabrication processes from a material including, but not limited to, a plastic or a metal. For example, the one or more fabrication processes may include, but are not limited to, molding (e.g., injection molding, compression molding, or the like), vacuum casting, thermoforming, 3D-printing, metal-casting, machining, cutting, folding, punching, shearing, stamping, or the like.

FIGS. 2A and 2B generally illustrate exemplary embodiments of the apparatus 100 including the personal electronic device holder, according to the inventive concepts disclosed herein.

The apparatus 100 may include a recess 200 in the top surface 104. The recess 200 may include a perimeter of a selected shape. For example, the recess 200 may include a trapezoidal-shaped (or substantially trapezoidal-shaped) perimeter. For instance, the recess 200 may be configured to receive the paddle 112 when the PED holder 110 is in the closed position. By way of another example, the top surface 104 may include a rectangular (or substantially rectangular) perimeter. For instance, the recess 200 may be configured to receive the paddle 112a when the PED holder 110 is in the closed position. By way of another example, the recess 200 may include a free-form perimeter that is symmetric when split via a line through the long sides and/or the short sides of the recess 200. Therefore, the following description should not be interpreted as a limitation on the present disclosure but merely an illustration.

It is noted herein a length of the recess 200 may be defined as a distance between the long sides of the recess 200. In addition, it is noted herein a width of the recess 200 may be defined as a distance between the short sides of the recess 200.

The recess 200 may include a selected depth. For example, the selected depth may be equal to or greater than a thickness of the paddle 112, such that the top paddle surface 114 may be flush (or substantially flush) with the top surface 104 when the PED holder 110 is in the closed position.

The body of the apparatus 100 may include a bottom section. For example, as illustrated in FIG. 2A, the apparatus 100 may include a bottom section 202, where the bottom section 202 may include a recess 204 (e.g., notch, groove, indentation, or the like). For instance, the recess 204 may be positioned within the bottom section 202 and a front surface of the body. In addition, the recess 204 may be a selected shape including, but not limited to, at least a portion of a spherical cap, a wedge (e.g., triangular prism), a rectangular prism, or other polyhedron known in the art. Further, the recess 204 may include an interior edge including, but not limited to, a sharp corner, a chamfered edge (e.g., sloped or angled edge), a filleted edge (e.g., rounded edge), or any other type of edge known in the art. By way of another example, as illustrated in FIG. 2B, the apparatus 100 may include a bottom section 202a without the recess 204.

It is noted herein that any description of the bottom section 200 may be extended to the bottom section 202a. Therefore, the following description should not be interpreted as a limitation on the present disclosure but merely an illustration.

The bottom section 200 may include a perimeter that conforms (or substantially conforms) in size and/or shape to the perimeter of the top section 102. It is noted herein, however, that the bottom section 200 may not include a perimeter that conforms (or substantially conforms) in size and/or shape to the top section 102. Therefore, the following description should not be interpreted as a limitation on the present disclosure but merely an illustration.

It is noted herein that the bottom section 202 may be fabricated via one or more fabrication processes from a material including, but not limited to, a plastic or a metal. For example, the one or more fabrication processes may include, but are not limited to, molding (e.g., injection molding, compression molding, or the like), vacuum casting, thermoforming, 3D-printing, metal-casting, machining, cutting, folding, punching, shearing, stamping, or the like.

Figure 3A:
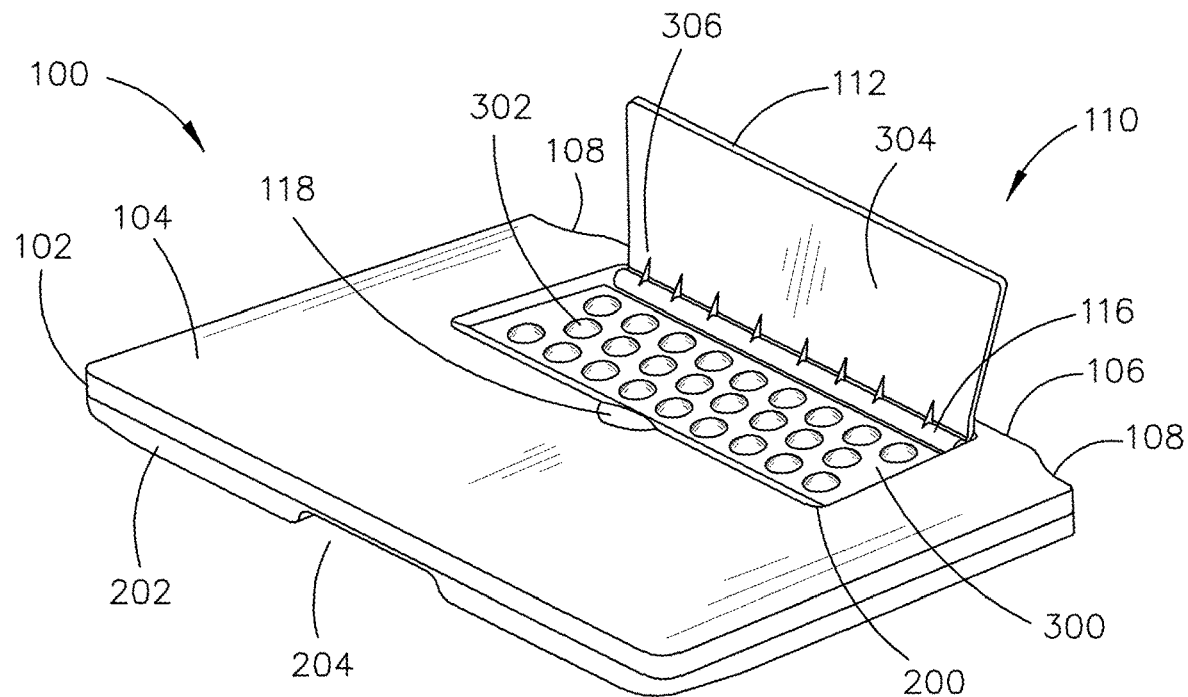
FIG. 3A is an isometric view of an exemplary embodiment of an apparatus including a personal electronic device holder according to the inventive concepts disclosed herein.
Figure 3B:
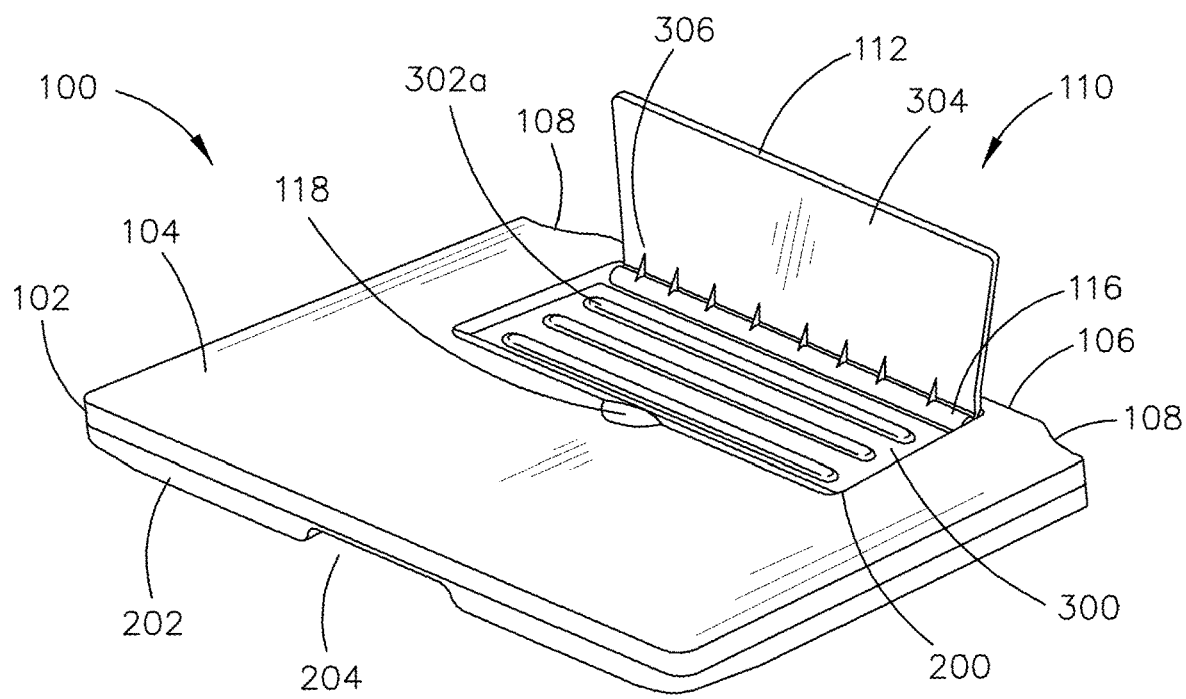
FIG. 3B is an isometric view of an exemplary embodiment of an apparatus including a personal electronic device holder according to the inventive concepts disclosed herein.
Figure 3A:
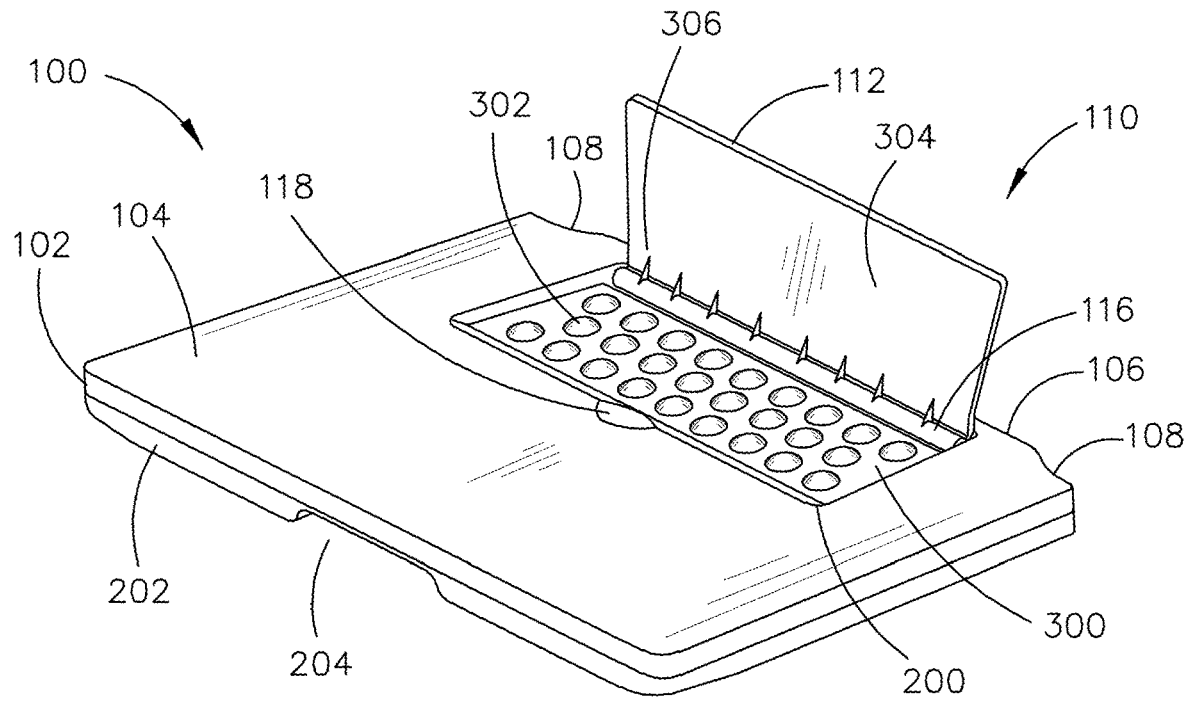
Figure 3B:
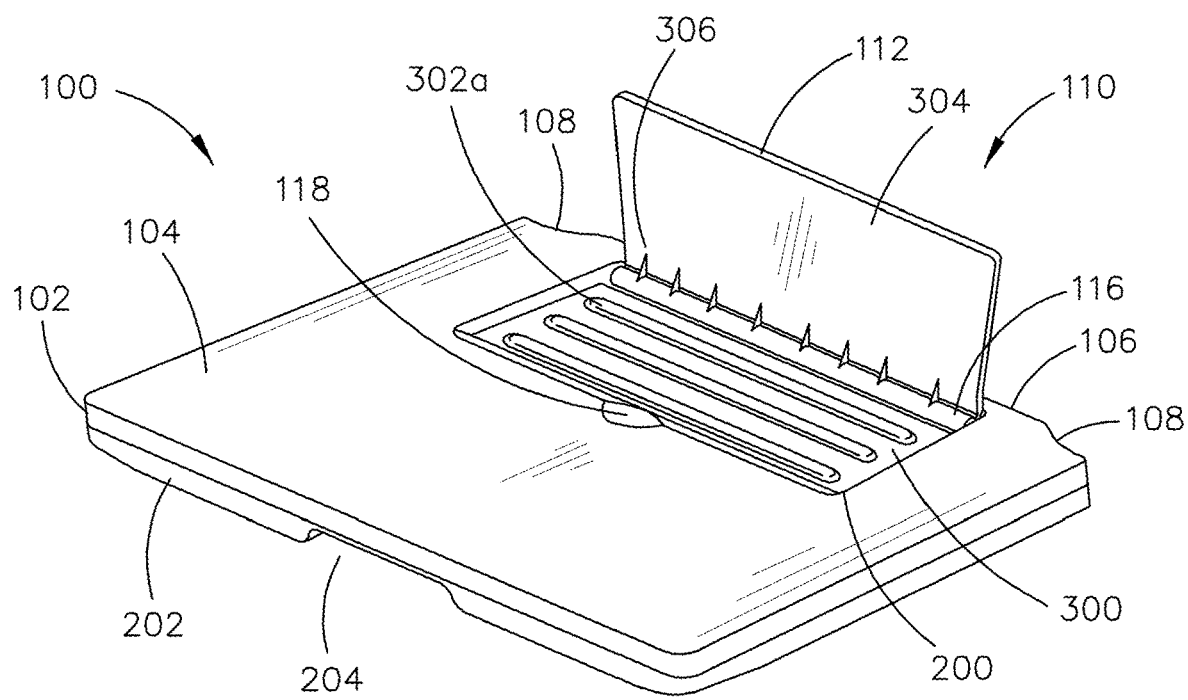
Figure 3C:
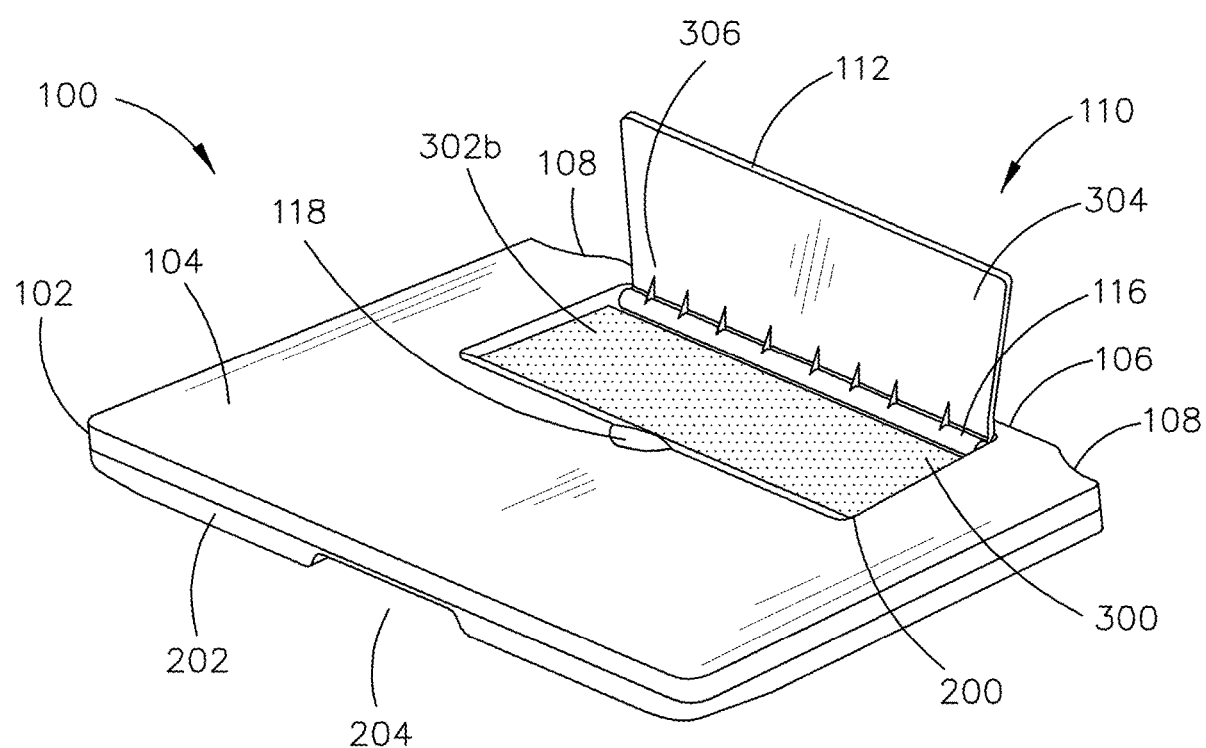
FIG. 3C is an isometric view of an exemplary embodiment of an apparatus including a personal electronic device holder according to the inventive concepts disclosed herein.

FIGS. 3A-3C generally illustrate exemplary embodiments of the apparatus 100 including the personal electronic device holder, according to the inventive concepts disclosed herein.

The apparatus 100 may include a recess surface 300 within the recess 200. The recess surface 300 may be set at a selected depth within the top surface 104. For example, the selected depth may be equal to or greater than a thickness of the paddle 112, such that the top paddle surface 114 may be flush (or substantially flush) with the top surface 104 when the PED holder 110 is in the closed position.

The recess surface 300 may include one or more contact points. For example, the one or more contact points may include one or more protrusions. For instance, as illustrated in FIG. 3A, the one or more protrusions may include one or more bumps 302 (e.g., dimples 302). In addition, as illustrated in FIG. 3B, the one or more protrusions may include one or more bars 302a. By way of another example, as illustrated in FIG. 3C, the one or more contact points may include one or more friction surface pads 302b.

The one or more bumps 302 may be a selected shape. For example, the selected shape may include, but is not limited to, at least a portion of a spherical cap, such that the one or more bumps 302 do not include a vertical face. By way of another example, the selected shape may include, but is not limited to, at least a portion of a wedge (e.g., triangular prism), a rectangular prism, or other polyhedron known in the art. The one or more bumps 302 may include an exterior edge including, but not limited to, a sharp corner, a chamfered edge (e.g., sloped or angled edge), a filleted edge (e.g., rounded edge), or any other type of edge known in the art. The one or more bumps 302 may be arranged in a pattern including offset or alternating rows, such that a bump 302 within a row of bumps 302 is positioned in-line with a gap between adjacent bumps 302 in an additional row of bumps 302 in front of and/or behind the row of bumps 302. The one or more bumps 302 may be arranged in a pattern including aligned rows and columns, such that a bump 302 within a row of bumps 302 is positioned in-line with a bump 302 in an additional row of bumps 302 in front of and/or behind the row of bumps 302.

The one or more bars 302a may be a selected shape including, but not limited to, at least a portion of a capsule (e.g., a cylinder with hemispherical ends) such that the one or more bars 302a do not include a vertical face. The selected shape may include, but is not limited to, at least a portion of a cylinder. The selected shape may include, but is not limited to, at least a portion of a wedge (e.g., triangular prism), a rectangular prism, or other polyhedron known in the art. The one or more bars 302a may include an exterior edge including, but not limited to, a sharp corner, a chamfered edge (e.g., sloped or angled edge), a filleted edge (e.g., rounded edge), or any other type of edge known in the art. The one or more bars 302a may include one or more parallel (or substantially parallel) unbroken bars. The one or more bars 302a may include one or more bars broken into one or more bar segments. The one or more bar segments may be arranged in a pattern including offset or alternating rows, such that a bar segment within a row of bar segments is positioned in-line with a gap between adjacent bar segments in an additional row of bar segments in front of and/or behind the row of bar segments. The one or more bar segments may be arranged in a pattern including aligned rows and columns, such that a bar segment within a row of bar segments is positioned in-line with a bar segment in an additional row of bar segments in front of and/or behind the row of bar segments.

The one or more friction surface pads 302b may include a laminate-type insert or coating on the recess surface 300. All or a portion of the recess surface 300 may include the one or more friction surface pads 302b. It is noted herein that the one or more protrusions (e.g., one or more bumps 302 the one or more bars 302a, or the like) may be covered in a coating to give the one or more protrusions a friction surface similar to the one or more friction surface pads 302b.

The paddle 112 may include a bottom paddle surface 304. For example, the bottom paddle surface 304 may be hidden within the recess 200 when the PED holder 110 is in the closed position. The bottom paddle surface 304 may be separated from a selected amount from the one or more protrusions (e.g., the one or more bumps 302 or the one or more bars 302a) or the one or more friction surface pads 302b within the recess 200. It is noted herein, however, that the bottom paddle surface 304 may come into contact with the one or more protrusions (e.g., the one or more bumps 302 or the one or more bars 302a) or the one or more friction surface pads 302b within the recess 200. Therefore, the following description should not be interpreted as a limitation on the present disclosure but merely an illustration.

Although the present disclosure is directed to the bottom paddle surface 304 being trapezoidal-shaped (or substantially trapezoidal-shaped), similar to the top paddle surface 114, it is noted herein the bottom paddle surface 304 may be rectangular (or substantially rectangular) similar to the top paddle surface 114a. Therefore, the following description should not be interpreted as a limitation on the present disclosure but merely an illustration.

The PED holder 110 may include one or more support fins 306. For example, the one or more support fins 306 may be coupled to the bottom paddle surface 304 and an exterior surface of the hinge coupler 116. For example, the paddle 112, the hinge coupler 116, and the one or more support fins 306 may be a single component fabricated via one or more fabrication processes from a material including, but not limited to, a plastic or a metal. For example, the one or more fabrication processes may include, but are not limited to, molding (e.g., injection molding, compression molding, or the like), vacuum casting, thermoforming, 3D-printing, metal-casting, machining, cutting, folding, punching, shearing, stamping, or the like. The paddle 112, the hinge coupler 116, and/or the one or more support fins 306 may be separate components coupled together via one or more fabrication processes, an adhesive, one or more component-integrated fasteners, one or more secondary fasteners, or the like.

Although the present disclosure is directed to the PED holder 110 including the one or more support fins 306, it is noted herein the PED holder 110 may not include and/or require the one or more support fins 306. Therefore, the following description should not be interpreted as a limitation on the present disclosure but merely an illustration.

Figure 4A:
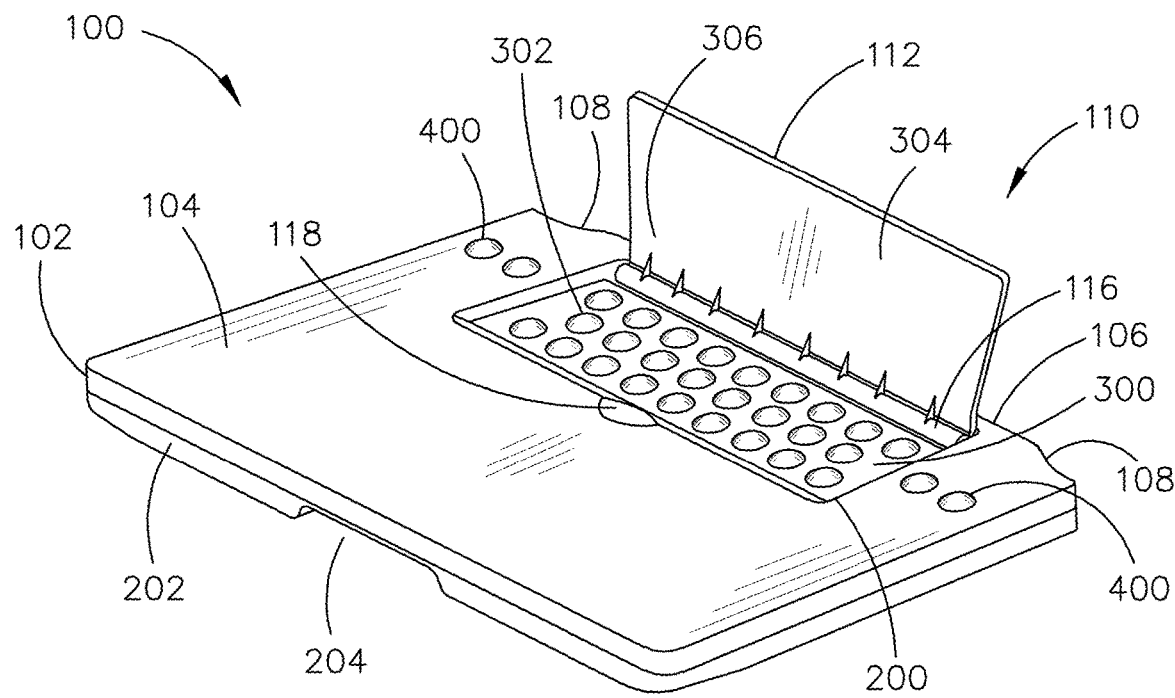
FIG. 4A is an isometric view of an exemplary embodiment of an apparatus including a personal electronic device holder according to the inventive concepts disclosed herein.
Figure 4B:
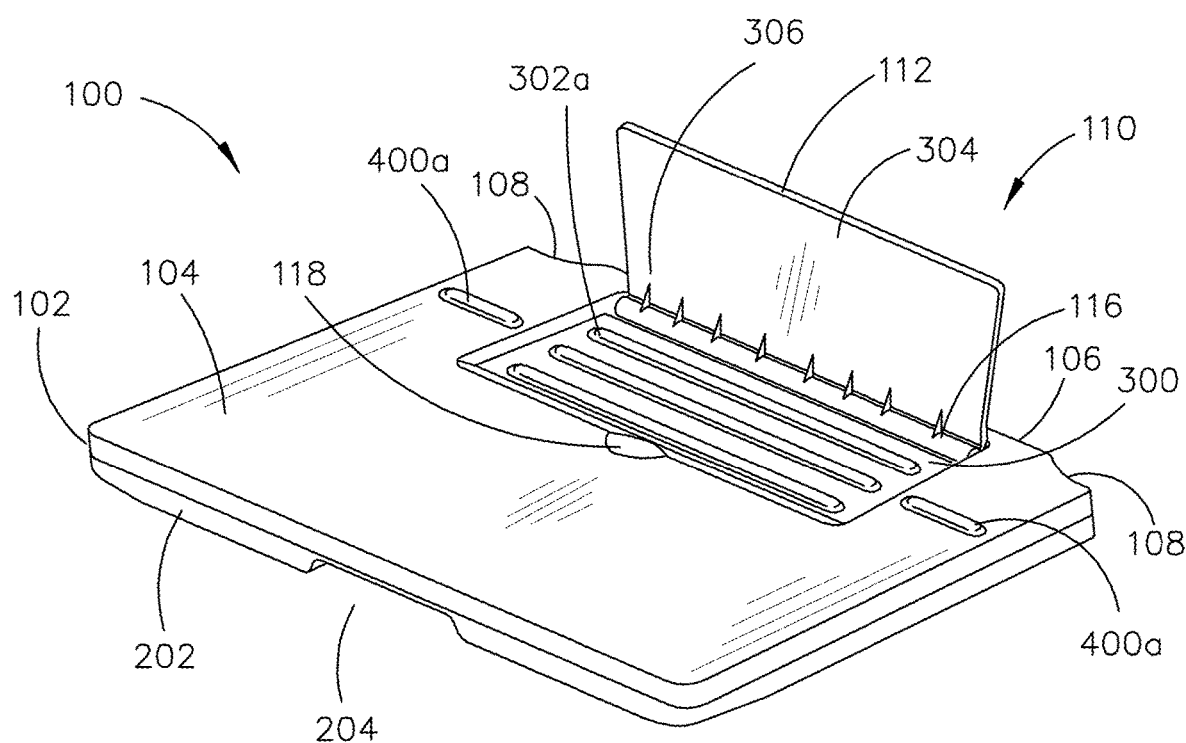
FIG. 4B is an isometric view of an exemplary embodiment of an apparatus including a personal electronic device holder according to the inventive concepts disclosed herein.
Figure 4C:
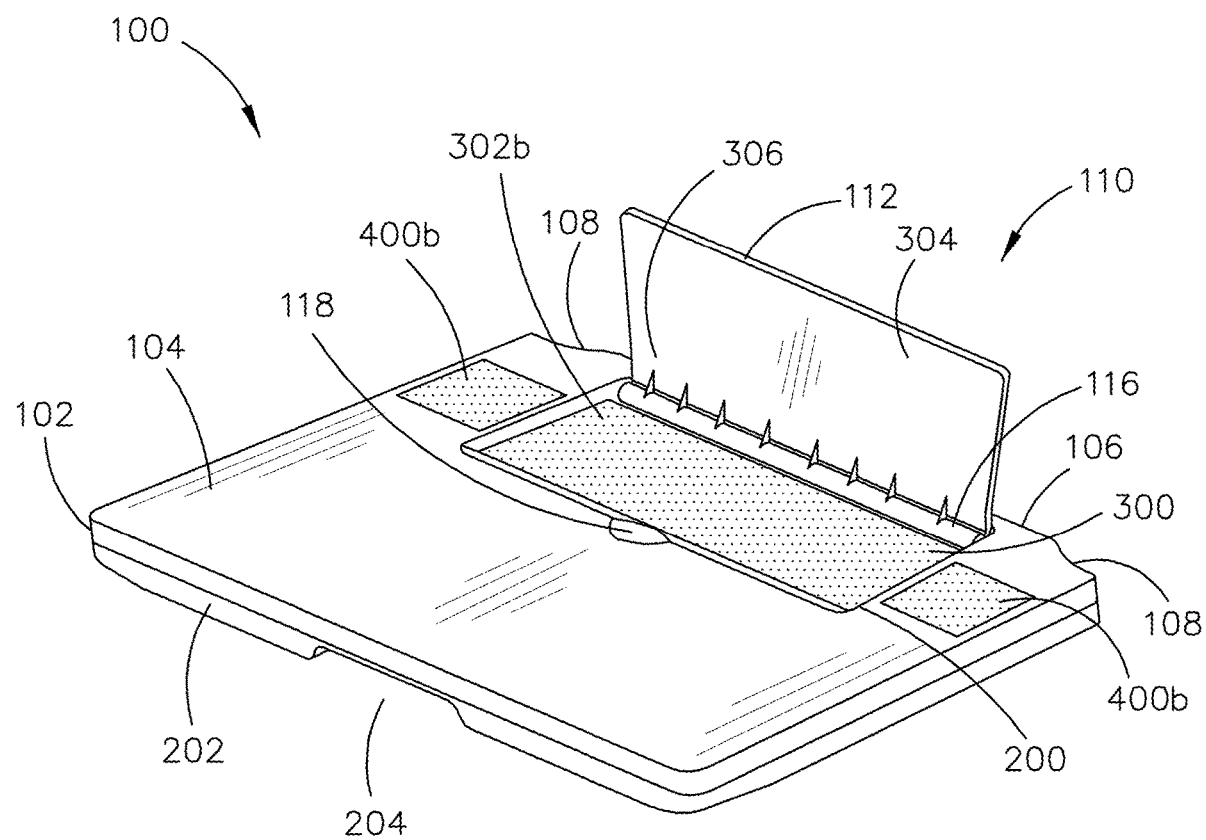
FIG. 4C is an isometric view of an exemplary embodiment of an apparatus including a personal electronic device holder according to the inventive concepts disclosed herein.

FIGS. 4A-4C generally illustrate exemplary embodiments of the apparatus 100 including the personal electronic device holder, according to the inventive concepts disclosed herein.

The top surface 104 may include one or more contact points proximate to a first side and/or an additional side of the recess. For example, the one or more contact points may include one or more protrusions. For instance, as illustrated in FIG. 4A, the one or more protrusions may include one or more bumps 400 (e.g., dimples 400). In addition, as illustrated in FIG. 4B, the one or more protrusions may include one or more bars 400a. By way of another example, as illustrated in FIG. 4C, the one or more contact points may include one or more friction surface pads 400b.

The one or more bumps 400 may be a selected shape. For example, the selected shape may include, but is not limited to, at least a portion of a spherical cap, such that the one or more bumps 400 do not include a vertical face. By way of another example, the selected shape may include, but is not limited to, at least a portion of a wedge (e.g., triangular prism), a rectangular prism, or other polyhedron known in the art. The one or more bumps 400 may include an exterior edge including, but not limited to, a sharp corner, a chamfered edge (e.g., sloped or angled edge), a filleted edge (e.g., rounded edge), or any other type of edge known in the art. The one or more bumps 400 may be arranged in a pattern including offset or alternating rows, such that a bump 400 within a row of bumps 400 is positioned in-line with a gap between adjacent bumps 400 in an additional row of bumps 400 in front of and/or behind the row of bumps 400. The one or more bumps 400 may be arranged in a pattern including aligned rows and columns, such that a bump 400 within a row of bumps 400 is positioned in-line with a bump 400 in an additional row of bumps 400 in front of and/or behind the row of bumps 400.

The one or more bars 400a may be a selected shape including, but not limited to, at least a portion of a capsule (e.g., a cylinder with hemispherical ends) such that the one or more bars 302a do not include a vertical face. The selected shape may include, but is not limited to, at least a portion of a cylinder. The selected shape may include, but is not limited to, at least a portion of a wedge (e.g., triangular prism), a rectangular prism, or other polyhedron known in the art. The one or more bars 400a may include an exterior edge including, but not limited to, a sharp corner, a chamfered edge (e.g., sloped or angled edge), a filleted edge (e.g., rounded edge), or any other type of edge known in the art. The one or more bars 400a may include one or more parallel (or substantially parallel) unbroken bars. The one or more bars 400a may include one or more bars broken into one or more bar segments. The one or more bar segments may be arranged in a pattern including offset or alternating rows, such that a bar segment within a row of bar segments is positioned in-line with a gap between adjacent bar segments in an additional row of bar segments in front of and/or behind the row of bar segments. The one or more bar segments may be arranged in a pattern including aligned rows and columns, such that a bar segment within a row of bar segments is positioned in-line with a bar segment in an additional row of bar segments in front of and/or behind the row of bar segments.

The one or more friction surface pads 400b may include a laminate-type insert or coating on the top surface 104. All or a portion of the top surface 104 may include the one or more friction surface pads 400b. It is noted herein that the one or more protrusions (e.g., one or more bumps 400 or the one or more bars 400a) may be covered in a coating to give the one or more protrusions a friction surface similar to the one or more friction surface pads 400b.

The one or more bumps 400, the one or more bars 400a, and/or the one or more friction surface pads 400b may be arranged within a pattern including one or more rows and/or within one or more columns on the top body surface 104. The one or more bumps 400, the one or more bars 400a, and/or the one or more friction surface pads 400b may be arranged in a pattern including one or more rows and/or within one or more columns that extends onto the top paddle surface 114.

The one or more bumps 400 and/or the one or more bars 400a may be in a different plane that is parallel (or substantially parallel) to a plane defining the placement of the one or more bumps 302 and/or the one or more bars 302a. For example, the one or more bumps 302 and/or the one or more bars 302a may be in a plane defined by the recess surface 300, while the one or more bumps 400 and/or the one or more bars 400a may be in an additional plane defined by the top surface 104. It is noted herein, however, that one or more bumps 400 and/or the one or more bars 400a and the one or more bumps 302 and/or the one or more bars 302a may share a plane. Therefore, the above description should not be interpreted as a limitation on the present disclosure but merely an illustration.

Although the present disclosure is directed to pairing similar-type contact points, it is noted herein the one or more bumps 400, the one or more bars 400a, and/or the one or more friction surface pads 400b may be paired with any of the one or more bumps 302, the one or more bars 302a, or the one or more friction surface pads 302b. In addition, it is noted herein the one or more bumps 400, the one or more bars 400a, and/or the one or more friction surface pads 400b may be implemented without the one or more bumps 302, the one or more bars 302a, and/or the one or more friction surface pads 302b. Therefore, the above description should not be interpreted as a limitation on the present disclosure but merely an illustration.

Figure 5A:
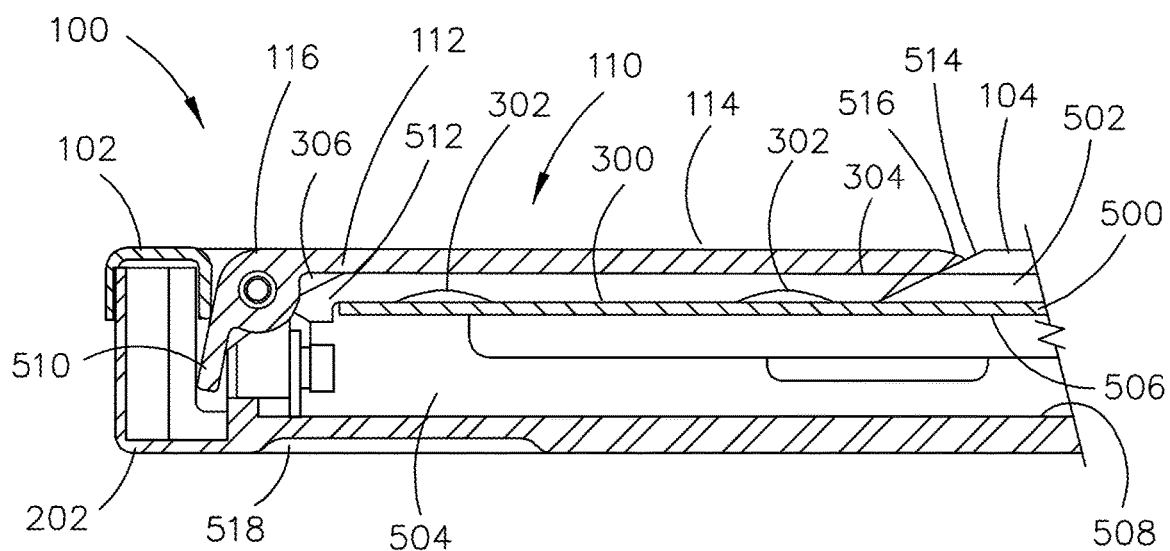
FIG. 5A is a partial side cross-section view of an exemplary embodiment of an apparatus including a personal electronic device holder according to the inventive concepts disclosed herein.
Figure 5B:
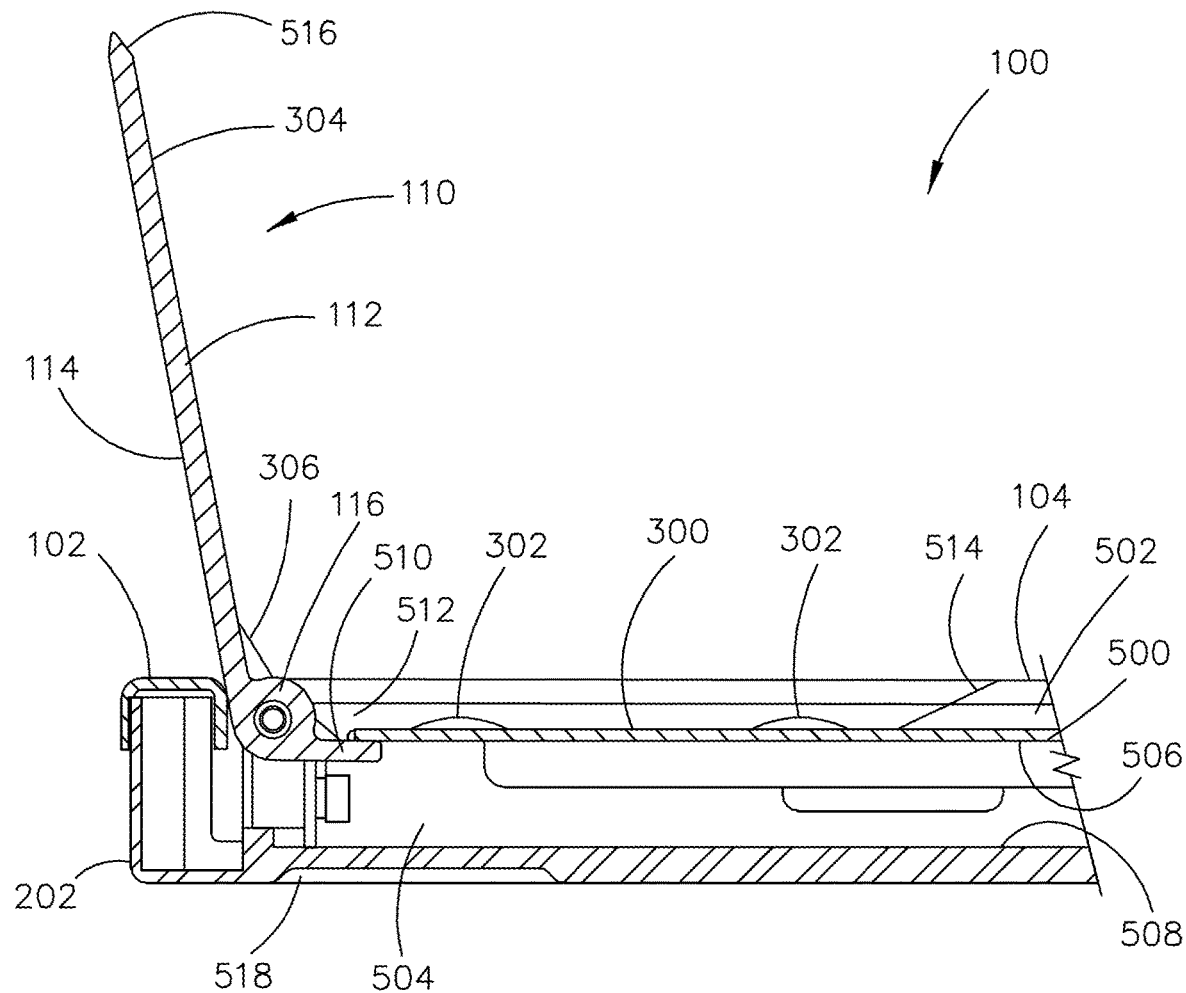
FIG. 5B is a partial side cross-section view of an exemplary embodiment of an apparatus including a personal electronic device holder according to the inventive concepts disclosed herein.

FIGS. 5A and 5B generally illustrate exemplary embodiments of the apparatus 100 including the personal electronic device holder, according to the inventive concepts disclosed herein.

The apparatus 100 may include one or more interior support plates. For example, the apparatus 100 may include an interior support plate 500. For instance, the recess surface 300 may be formed from at least a portion of a top surface of the interior support plate 500. It is noted herein that the recess surface 300 may be formed from the portion of the top section 102. In this regard, the portion of the top section 102 is supported by the interior support plate 500. Therefore, the above description should not be interpreted as a limitation on the present disclosure but merely an illustration. By way of another example, the apparatus 100 may include an interior support plate 502. For instance, a portion of the interior support plate 502 may be positioned between the interior support plate 500 and the top section 102.

The interior support plate 500 and the interior support plate 502 may be a single component fabricated via one or more fabrication processes from a material including, but not limited to, a plastic or a metal. For example, the one or more fabrication processes may include, but are not limited to, molding (e.g., injection molding, compression molding, or the like), vacuum casting, thermoforming, 3D-printing, metal-casting, machining, cutting, folding, punching, shearing, stamping, or the like. The interior support plate 500 and the interior support plate 502 may be separate components coupled together via one or more fabrication processes, an adhesive, one or more component-integrated fasteners, one or more secondary fasteners, or the like.

The apparatus 100 may include a cavity 504 defined by at least one surface of the top section 102 and at least one surface of the bottom section 202. For example, the cavity 504 may be defined by at least a bottom interior surface 506 of the top section 102 and a top interior surface 508 of the bottom section 202. For instance, the cavity 504 may be defined by a bottom interior surface 506 of the recess surface 300. In addition, the cavity 504 may be defined by a bottom interior surface 506 of the interior support plate 500. It is noted herein that the bottom interior surface of the top section 102 and the top interior surface 508 of the bottom section 202 may be parallel (or substantially parallel).

The apparatus 100 may include a tab 510. For example, the tab 510 may be coupled to an exterior surface of the hinge coupler 116. For example, the tab 510 may extend from the hinge coupler 116 along a tangent line from a point on the exterior surface of the hinge coupler 116. For instance, the paddle 112 may extend from the hinge coupler 116 at an angle perpendicular (or substantially perpendicular) to a line through the width (e.g., diameter) of the hinge coupler 116. In addition, the tab 510 may be set at an angle perpendicular (or substantially perpendicular) relative to an orientation of the paddle 112. In this regard, the tab 510 and the paddle 112 may form (or substantially form) an L-shape. It is noted herein, however, that the tab 510 may extend from the hinge coupler 116 and/or be set relative to the orientation of the paddle 112 at any angle ranging from parallel (or substantially parallel) to perpendicular (or substantially perpendicular).

The tab 510, the paddle 112, the hinge coupler 116, and the one or more support fins 306 may be a single component fabricated via one or more fabrication processes from a material including, but not limited to, a plastic or a metal. For example, the one or more fabrication processes may include, but are not limited to, molding (e.g., injection molding, compression molding, or the like), vacuum casting, thermoforming, 3D-printing, metal-casting, machining, cutting, folding, punching, shearing, stamping, or the like. The paddle 112, the hinge coupler 116, the tab 510, and/or the one or more support fins 306 may be separate components coupled together via one or more fabrication processes, an adhesive, one or more component-integrated fasteners, one or more secondary fasteners, or the like.

The range of angle rotation for the PED holder 110 may be limited by one or more components of the apparatus 100. For example, the tab 510 and/or the hinge coupler 116 may come into contact with the top section 102 and/or the bottom section 202 when the PED holder 110 is in the closed position. By way of another example, the tab 510 may come into contact with the bottom interior surface 506 partially defining the cavity 504. The tab 510 coming into contact with the bottom interior surface 506 may prevent rotation of the PED holder 110 in a selected direction. It is noted herein that the tab 510 coming into contact with the bottom interior surface 506 may be considered a "hard stop" or "full stop" for purposes of the present disclosure.

The hinge coupler 116 may rotate within a cut-out 512. For example, the cut-out 512 may be within the top section 102 and/or the recess 200. By way of another example, the cut-out 512 may connect the cavity 504 to the recess 200. Although examples throughout the present disclosure are directed to the cavity 504 and the cut-out 512 being hollow (or un-filled) to allow for rotation of the tab 510 and the hinge coupler 116, respectively, it is noted herein that at least a portion of the one or more of the cavity 504 and/or the cut-out 512 may be filled with one or more volume-filling materials including, but not limited to, a foam. Therefore, the above description should not be interpreted as a limitation on the present disclosure but merely an illustration.

The top section 102 includes a sloped surface 514 connecting the top surface 104 and the recess surface 200. For example, the hinge coupler 116 may rotate within the cut-out 512 and/or the recess 200 at an end of the recess 200 opposite the sloped surface 514. The paddle 112 may include a sloped side 516 that conforms (or substantially conforms) to the sloped surface 514 when the PED holder 110 is in the closed position. The bottom section 202 may include one or more recesses 518.

Figure 6A:
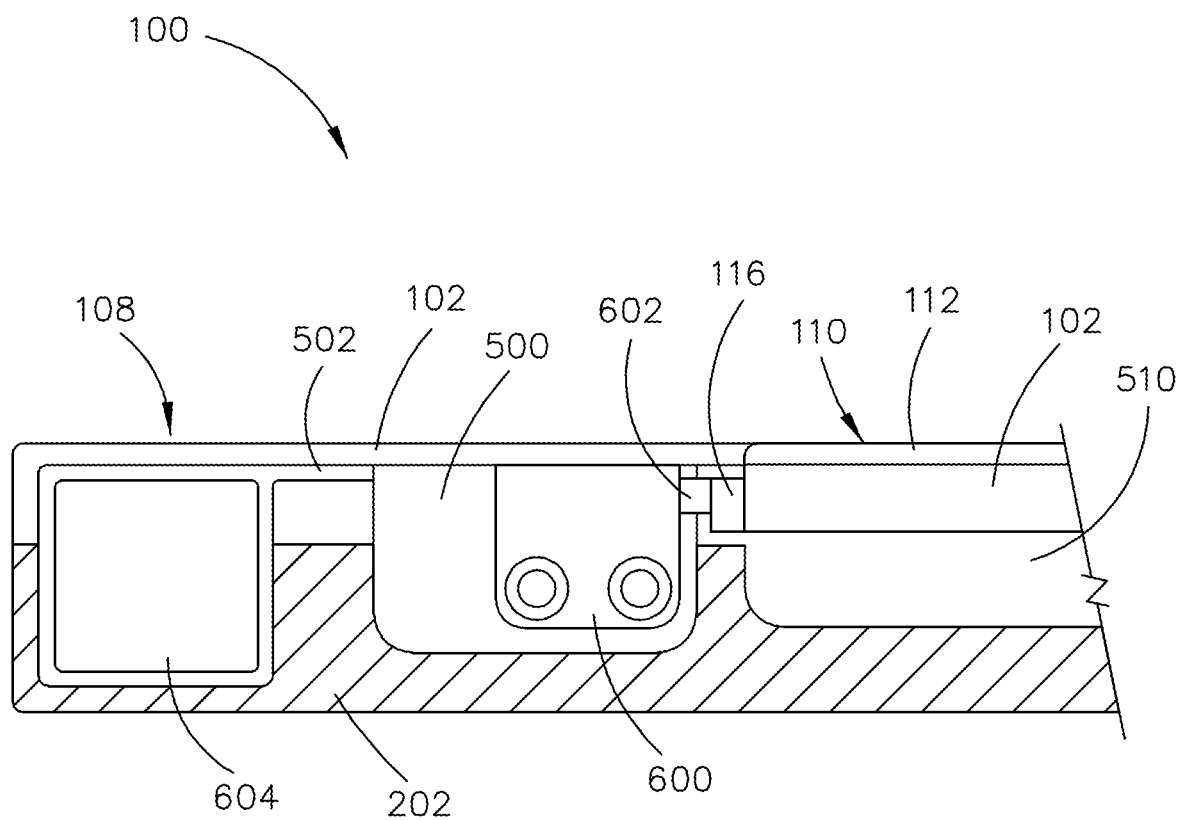
FIG. 6A is a partial rear cross-section view of an exemplary embodiment of an apparatus including a personal electronic device holder according to the inventive concepts disclosed herein.
Figure 6B:
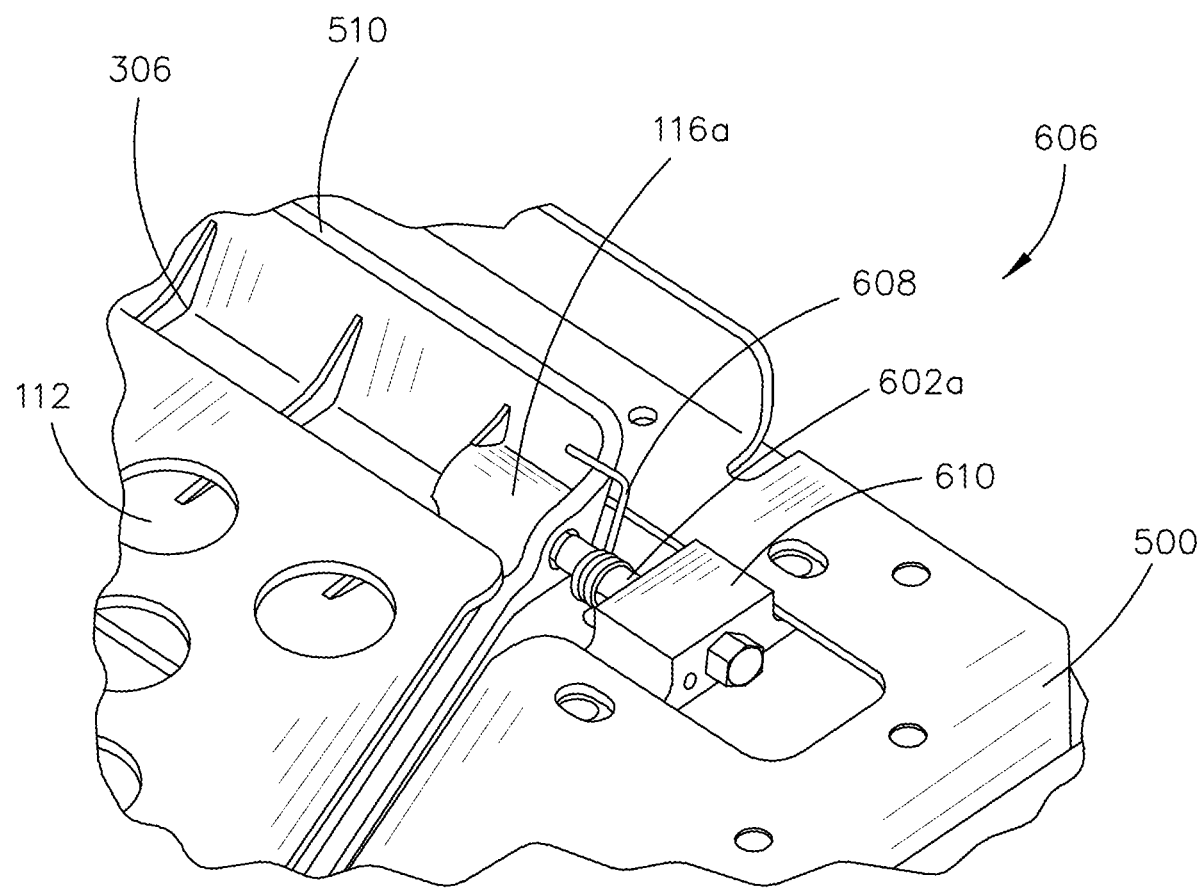
FIG. 6B is a partial isometric view of an exemplary embodiment of an apparatus including a personal electronic device holder according to the inventive concepts disclosed herein.
Figure 6C:
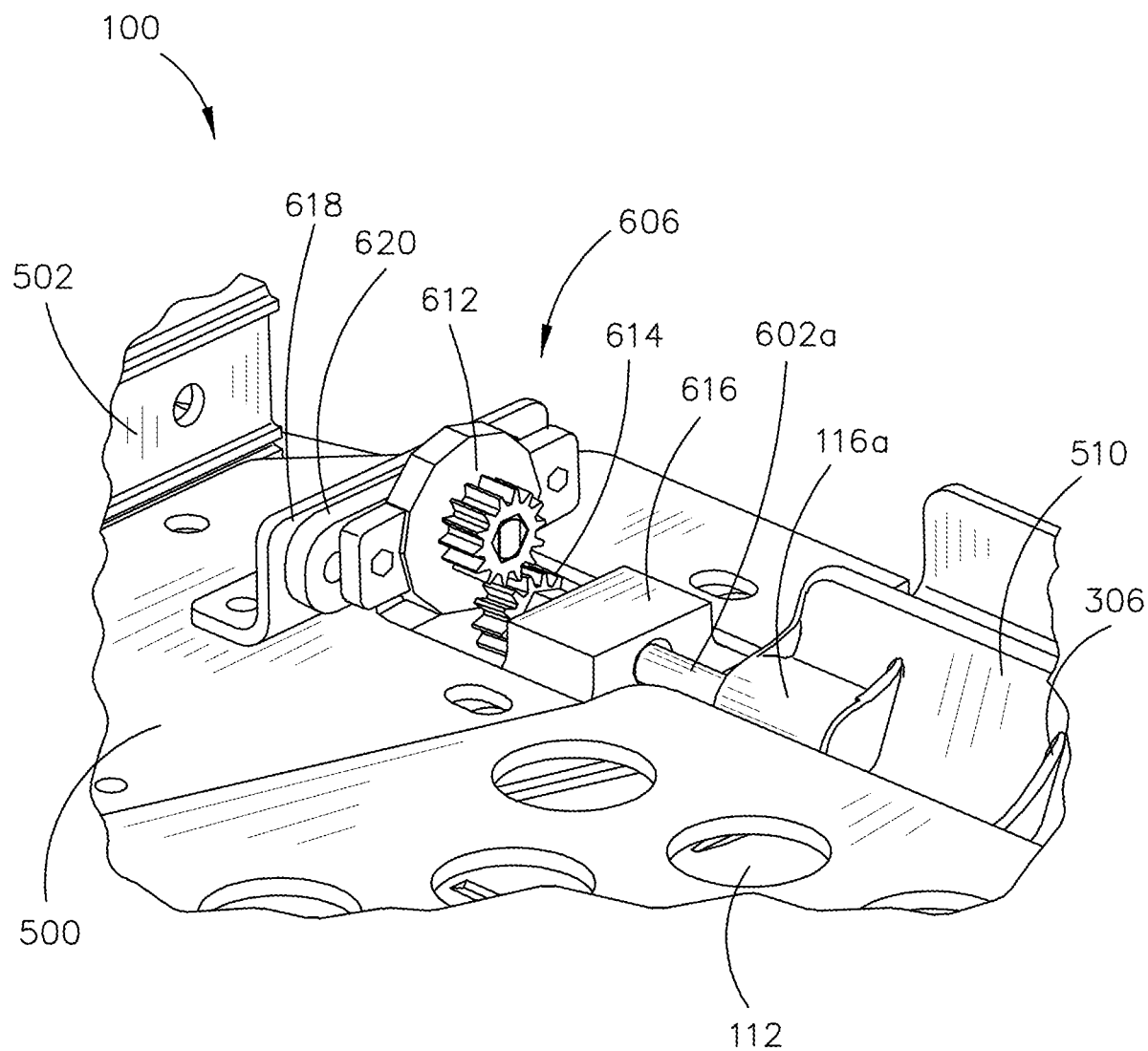
FIG. 6C is a partial isometric view of an exemplary embodiment of an apparatus including a personal electronic device holder according to the inventive concepts disclosed herein.

FIGS. 6A-6C illustrate exemplary embodiments of the apparatus 100 including the personal electronic device holder, according to the inventive concepts disclosed herein.

As illustrated in FIG. 6A, the apparatus 100 may include one or more hinges 600. The one or more hinges 600 may be coupled to the hinge coupler 116 via one or more axles 602. For example, the one or more hinges 600 may include a friction or torque hinge. For instance, the torque hinge may keep the PED holder 110 in place and prevent unwanted movement during operation and/or stowage of the apparatus 100. By way of another example, the one or more hinges 600 may include a self-closing (e.g., self-actuating) hinge. For instance, the self-closing hinge may be configured to keep the PED holder 110 in the closed position unless a force is applied to the paddle 112 that can overcome the return force provided by the self-closing hinge. By way of another example, the one or more hinges 600 may include a rotation-limited hinge. It is noted herein the PED holder 110 may not include and/or require the tab 510 as a limiting component of the range of angle rotation for the PED holder 110 where the one or more hinges 600 include a rotation-limited hinge. Therefore, the above description should not be interpreted as a limitation on the present disclosure but merely an illustration.

The apparatus 100 may include one or more seat rail channels 604. For example, the apparatus 100 may include two seat rail channels 604 surrounding/flanking the PED holder 110. The one or more seat rail channels 604 may include a cross-section corresponding to any shape in the art. For example, the cross-section may be rectangular. The one or more seat rail channels 604 may be embedded and/or otherwise positioned with the apparatus 100 between the top section 102 and the bottom section 202. The one or more cut-outs 108 may be proximate to the entrance point for the one or more seat rail channels 604.

As illustrated in FIGS. 6B and 6C, the apparatus 100 may include a spring-damper assembly 606. The spring-damper assembly 606 may include a torsion spring 608 wrapped around an axle 602a. As the PED holder 110 rotates to the open position, the torsion spring 606 deforms. In this regard, the torsion spring 606 may provide a return force to return the PED holder 110 to the closed position when not in use.

Generally, the spring-damper assembly 606 may include any type of spring known in the art. For example, the spring-damper assembly 606 may include, but is not limited to, one or more extension springs that increase in length when the PED holder 110 is in use in the open position, thus providing a return force to return the PED holder 110 to the closed position when not in use.

The axle 602a may be inserted into a hinge coupler 116a. The axle 602a may be coupled to a surface of the apparatus 100 via a support 610. For example, the support 610 may include, but is not limited to, a mounting block or mounting plate. By way of another example, the support 610 may be coupled to the interior support plate 500 and/or the interior support plate 502. A leg of the torsion spring 608 may engage a surface of the tab 510, while a second leg of the torsion spring 608 may engage a static structure (e.g., the support 610, the interior support plate 500, the interior support plate 502, or the like).

The tab 510, the paddle 112, the one or more support fins 306, and the set of hinge couplers 116a may be a single component fabricated via one or more fabrication processes from a material including, but not limited to, a plastic or a metal. For example, the one or more fabrication processes may include, but are not limited to, molding (e.g., injection molding, compression molding, or the like), vacuum casting, thermoforming, 3D-printing, metal-casting, machining, cutting, folding, punching, shearing, stamping, or the like. The paddle 112, the tab 510, the one or more support fins 306, and/or the set of hinge couplers 116a may be separate components coupled together via one or more fabrication processes, an adhesive, one or more component-integrated fasteners, one or more secondary fasteners, or the like.

The spring-damper assembly 606 may include a geared rotary damper 612. The geared rotary damper 612 may be coupled to an axle 602a via a gear 614. The axle 602a may be at least partially inserted into a hinge coupler 116a. The axle 602a may be coupled to a surface of the apparatus 100 via a support 116. The geared rotary damper 612 may be coupled to a surface of the apparatus 100 via a support 618. For example, one or more of the support 616 and/or the support 618 may include, but is not limited to, a mounting block or mounting plate. By way of another example, one or more of the support 610 and/or the support 168 may be coupled to the interior support plate 500 and/or the interior support plate 502. It is noted herein the support 116 and the support 118 may be a single component or separate components. A spacer 620 may be positioned between the geared rotary damper 612 and the support 618.

Although the spring-damper assembly 606 is directed to being coupled to a set of axles 602a at least partially inserted into corresponding hinge couplers 116a, it is noted herein that the spring-damper assembly 606 may be coupled to a single axle 602 at least partially inserted into a single hinge coupler 116. Therefore, the above description should not be interpreted as a limitation on the present disclosure but merely an illustration.

Figure 7A:
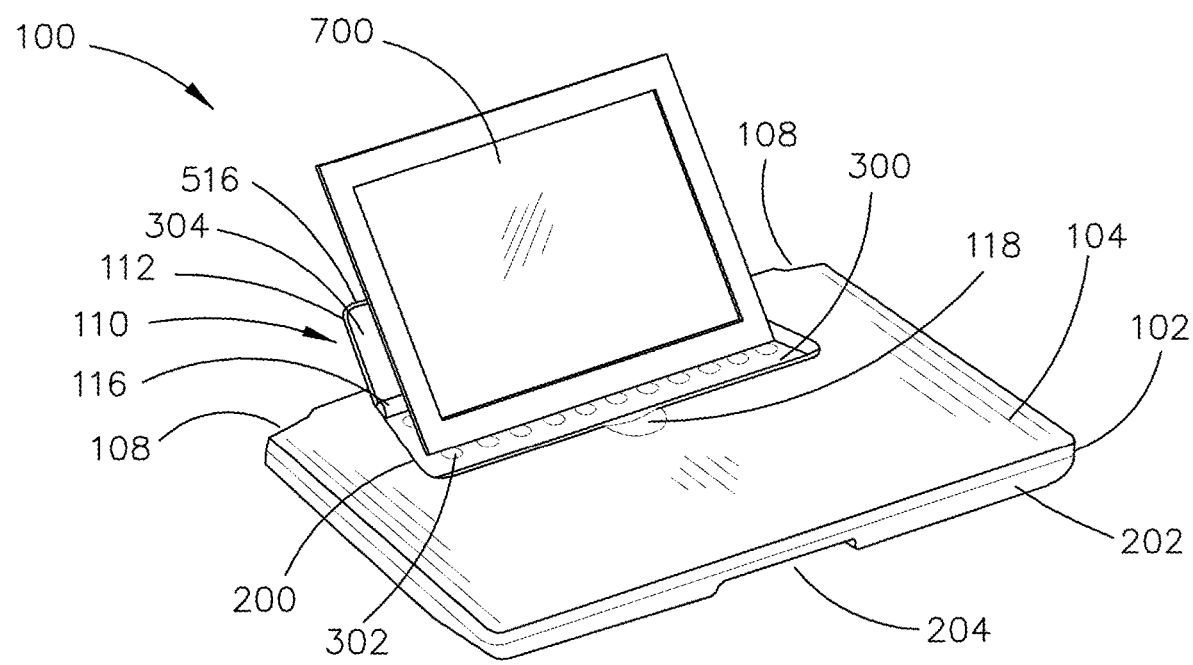
FIG. 7A is an isometric view of an exemplary embodiment of an apparatus including a personal electronic device holder according to the inventive concepts disclosed herein.
Figure 7B:
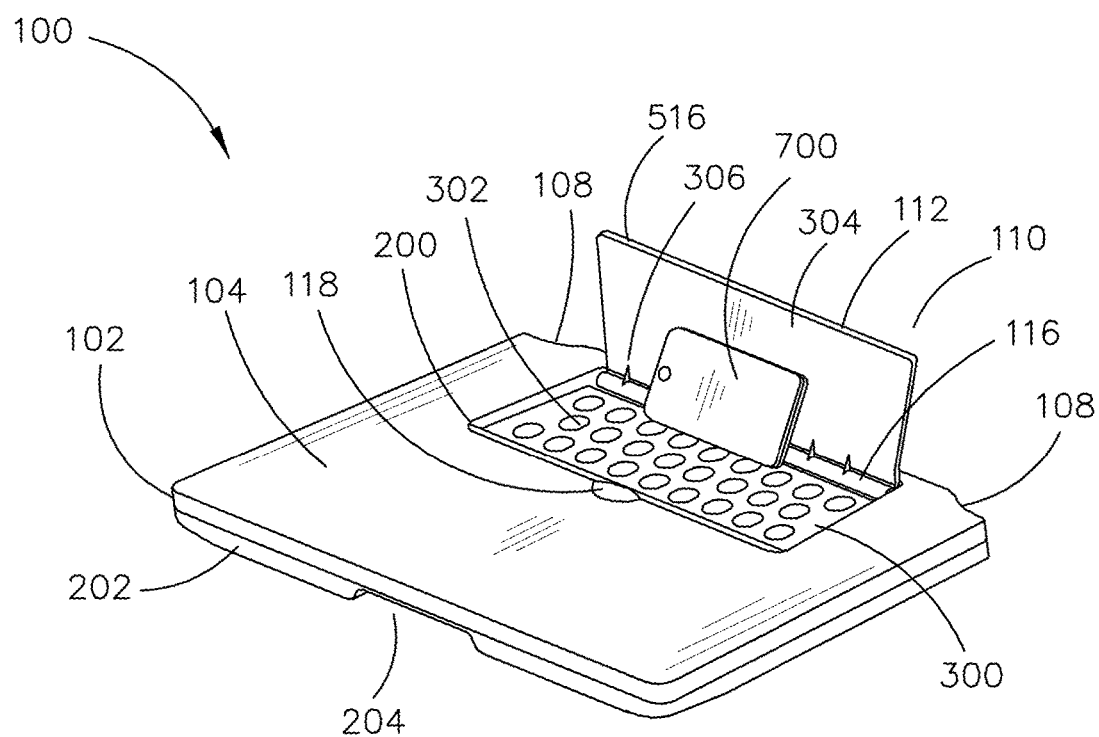
FIG. 7B is an isometric view of an exemplary embodiment of an apparatus including a personal electronic device holder according to the inventive concepts disclosed herein.
Figure 7C:
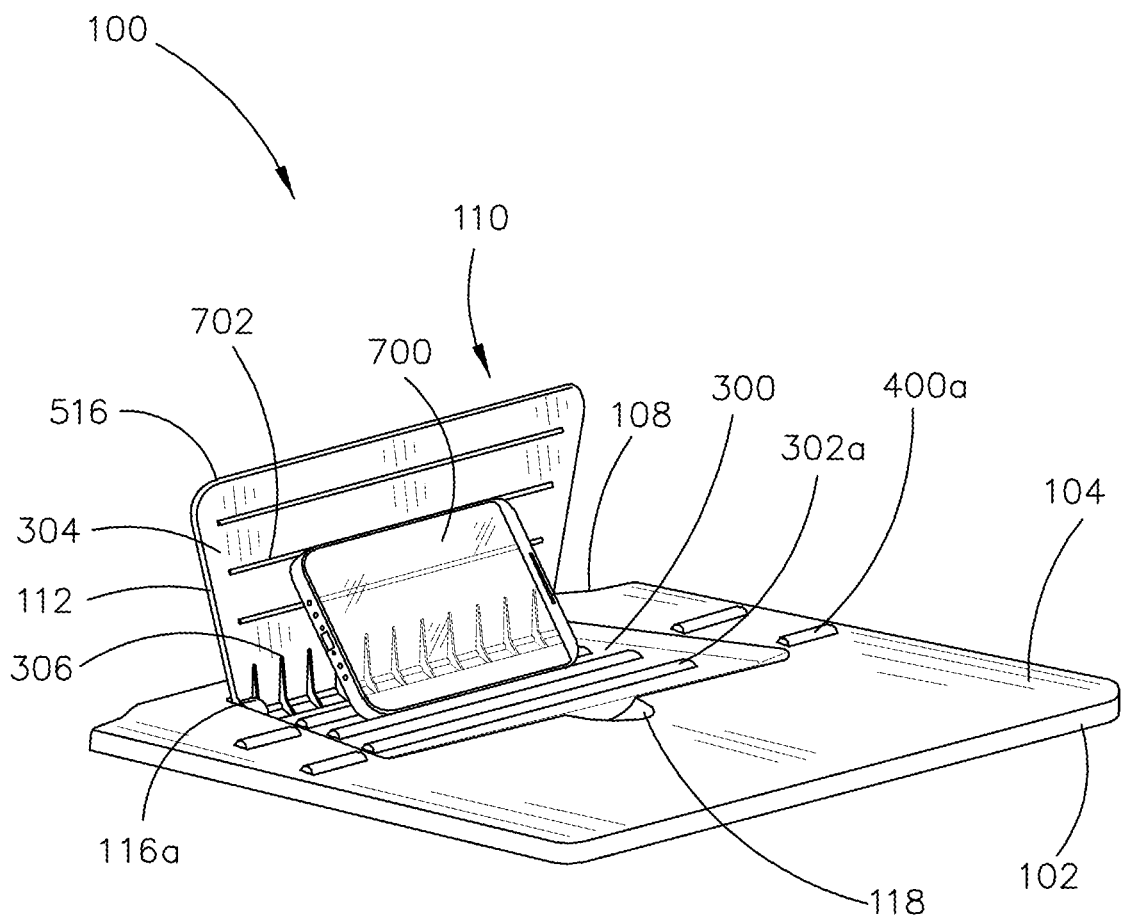
FIG. 7C is an isometric view of an exemplary embodiment of an apparatus including a personal electronic device holder according to the inventive concepts disclosed herein.

FIGS. 7A-7C generally illustrate exemplary embodiments of the apparatus 100 including the personal electronic device holder, according to the inventive concepts disclosed herein.

The apparatus 100 may be configured to support a personal electronic device 700. It is noted herein that "personal electronic device 700" and "PED 700" may be considered equivalent for purposes of the present disclosure.

The side 516 and/or the bottom paddle surface 304 of the paddle 112 may be configured to support the PED 700 (e.g., on a back surface of the PED 700) when in the PED holder 110 is in open position. The PED 700 may provide a force against the side 514 and/or the bottom paddle surface 304 of the paddle 112 when the PED 700 is placed on the apparatus 100. For example, the force provided by the PED 700 may be enough to overcome the return force provided by self-closing hinges, such that the PED holder 110 may remain open while the PED 700 is supported.

One or more sides of the PED 700 may engage a set of the one or more protrusions on the recess surface 300 (e.g., a set of the one or more bumps 302, a set of the one or more bars 302a, or the like), or may engage the one or more friction surface pads 302b. The one or more sides of the PED 700 may engage a set of the one or more protrusions on the top surface 104 (e.g., a set of the one or more bumps 400, a set of the one or more bars 400a, or the like), or engage the one or more friction surface pads 400b.

It is noted herein that the sloped surface 514 of the top section 102 may be set at a shallow angle, such that the sloped surface 514 may not be configured to engage the one or more sides of the PED 700. In this regard, the sloped surface 514 may not be configured to support the one or more sides of PED 700 when the PED holder 110 is in the open position.

Where the apparatus 100 includes the spring-damper assembly 606, it is noted herein that the PED 700 may be of a weight that is insufficient to overcome the force provided by the spring-damper assembly 606 when supported by the PED holder 110. As illustrated in FIG. 7C, the bottom paddle surface 304 of the paddle 112 may include one or more contact points 702. For example, the one or more contact points 702 may include, but are not limited to, one or more ledges or one or more grooves. One or more sides of the PED 700 may engage (e.g., wedge underneath, or the like) the one or more contact points 702. In this regard, the one or more contact points 702 may provide a friction surface or wedging effect that keeps the PED 700 in place, to supplement the force provided by the weight of the PED 700. It is noted herein the PED 700 is shown in a transparent state for purposes of clarity to illustrate the one or more components of the apparatus 100 behind the PED 700 when the PED 700 is supported by the PED holder 110.

The PED 700 may be any electronic device known in the art. For example, the PED 700 may a computer including one or more processors and memory. For instance, the PED 700 may be a handheld computer including, but not limited to, a tablet (e.g., as illustrated in FIG. 7A), a smartphone (e.g. as illustrated in FIG. 7B), a phablet, or the like. In addition, the PED 700 may be a convertible laptop including, but not limited to, a laptop with a single-fold hinge, a laptop with a double-fold hinge, a laptop with a twist-and-fold hinge, a laptop with a detachable display device and/or a detachable user input device, or the like. By way of another example, the PED 700 may be a display device communicatively coupled to a computer including, but not limited to, a desktop computer, a mainframe computer system, a workstation, an image computer, a parallel processor, a networked computer, or the like.

The one or more processors may include any one or more processing elements known in the art. In this sense, the one or more processors may include any microprocessor device configured to execute algorithms and/or program instructions. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory may include any storage medium known in the art suitable for storing the set of program instructions executable by the associated one or more processors. For example, the memory may include a non-transitory memory medium. For instance, the memory may include, but is not limited to, a read-only memory (ROM), a random access memory (RAM), a magnetic or optical memory device (e.g., disk), a magnetic tape, a solid state drive, and the like. The memory may be configured to provide display information to the display device (e.g., the PED 700, where the PED 700 includes a handheld computer or a convertible laptop; or a portion of the PED 700, where the PED 700 includes a display device communicatively coupled to a computer). In addition, the memory may be configured to store user input information from a user input device of a user interface. The memory may be housed in a common controller housing with the one or more processors. The memory may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The controller may be configured to receive and/or acquire data or information from other systems or tools by a transmission medium that may include wireline and/or wireless portions. In addition, the controller may be configured to transmit data or information (e.g., the output of one or more procedures of the inventive concepts disclosed herein) to one or more systems or tools by a transmission medium that may include wireline and/or wireless portions. In this regard, the transmission medium may serve as a data link between the controller and the other subsystems. In addition, the controller may be configured to send data to external systems via a transmission medium (e.g., network connection).

The display device may include any display device known in the art. For example, the display device may include, but is not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention The user input device may include any user input device known in the art. For example, the user input device may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

The display device may be coupled to the user input device. For example, the display device may be coupled to the user input device by a transmission medium that may include wireline and/or wireless portions. The display device and/or the user input device may be a component of the user interface.

Figure 8:
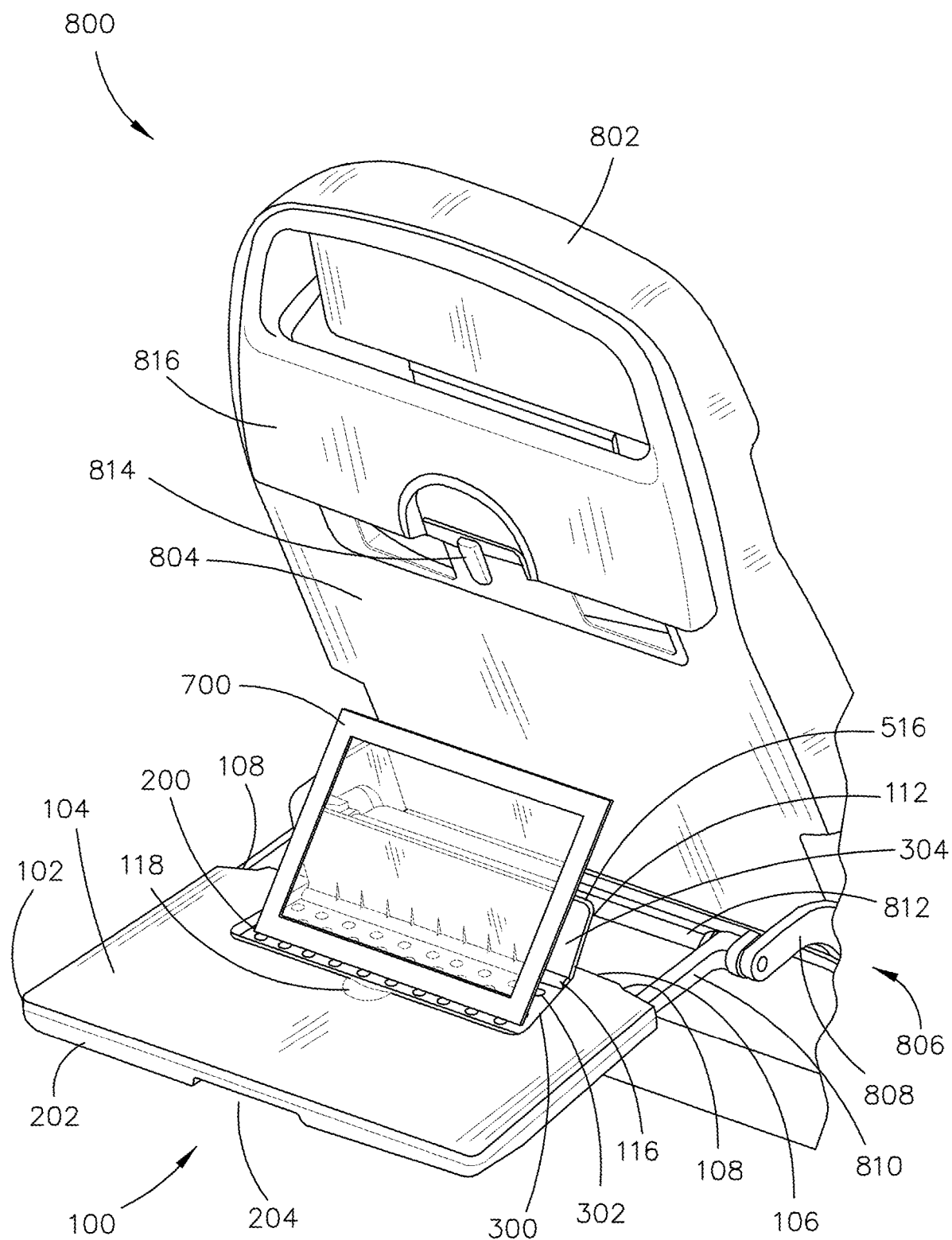
FIG. 8 is a partial isometric view of an exemplary embodiment of a system including an apparatus including a personal electronic device holder according to the inventive concepts disclosed herein.

FIG. 8 illustrates a diagrammatic illustration of an exemplary embodiment of a vehicle 800 including the personal electronic device holder 100 according to the inventive concepts disclosed herein.

The vehicle 800 may include any type of vehicle 800 known in the art. For example, the vehicle 800 may be any air, land, or water-based personal equipment or vehicle; any air, land, or water-based commercial equipment or vehicle; any air, land, or water-based military equipment or vehicle known in the art. For instance, the vehicle 800 may be a passenger aircraft.

Where the vehicle 800 is a passenger aircraft, the apparatus 100 may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

The vehicle 800 may include one or more on-board systems (e.g., onboard screens, controllers, or the like) in communication with the apparatus 100.

The vehicle 800 may include a cabin. For example, where the vehicle 800 is a passenger aircraft, the vehicle 800 may include an aircraft cabin. One or more seats 802 may be installed and/or configured or dimensioned to fit within the cabin. The apparatus 100 may be attached to a seat 802 via one or more couplers. For example, the apparatus 100 may be a seat back-mounted tray attached to a seat 802 in front of an additional seat 802.

Although the present disclosure is directed to the apparatus 100 being attached to a seat 802 in a cabin of the vehicle 800, it is noted herein the apparatus 100 may be attached directly to the vehicle 800 via the one or more couplers. For example, the apparatus 100 may be attached directly to a surface of the cabin. For instance, where the vehicle 800 is a passenger aircraft, the seat 802 may be located in the first row of the aircraft, such that the apparatus 100 is attached to a wall in front of the cabin seat. By way of another example, where the vehicle 800 is a passenger aircraft, the apparatus 100 may be attached on a surface of an aircraft galley. For instance, the apparatus 100 may be attached to a wall, compartment, counter, or other surface in the aircraft galley. Therefore, the above description should not be interpreted as a limitation on the present disclosure but merely an illustration.

It is noted herein the apparatus 100 may be a standalone device. For example, the apparatus 100 may be a desk, table, countertop, or the like. For instance, the apparatus 100 may be installed within the vehicle 800 without being coupled to the seat 802. In addition, the apparatus 100 may be a device sold for commercial or industrial use in either a home or a business, such that the apparatus 100 may not be installed and/or configured or dimensioned to fit within the vehicle 800. Therefore, the above description should not be interpreted as a limitation on the present disclosure but merely an illustration.

It is noted herein the PED 700 is shown in a transparent state for purposes of clarity to illustrate the one or more components of the apparatus 100 behind the PED 700 when the PED 700 is supported by the leaf 110.

The seat 802 may include a rear seat surface 804. The apparatus 100 may be coupled to the seat 102 (e.g., the rear seat surface 804, a bottom seat surface, or the like) via the one or more couplers. For example, a coupler may include, but is not limited to, one or more linkage assemblies 806. By way of another example, a coupler may include, but is not limited to, one or more component-integrated fasteners, one or more secondary fasteners, an adhesive, or the like.

A linkage assembly 806 may include a single axis about which components of the linkage assembly 806 may rotate (e.g., a single-fold assembly), two axes of rotation about which components of the linkage assembly 806 may rotate (e.g., a bi-fold assembly), or three or more axes of rotation about which components of the linkage assembly 806 may rotate. It is noted herein that the seat back-mounted tray may include the apparatus 100 and the linkage assembly 806.

The linkage assembly 806 may be configured to position the apparatus 100 in one or more positions relative to the seat 802. For example, the apparatus 100 may be in an upright (or stowed) position, may be in a down and undeployed position, and/or may be in a down and deployed position. For instance, the down and deployed position may include a selected distance between the rear seat surface 804 and the rear surface 106 of the apparatus 100, where the distance ranges from zero inches to three inches.

The linkage assembly 806 may include one or more seat members 808. For example, the one or more seat members 808 may be coupled to the rear seat surface 804 and/or a bottom seat surface of the seat 802. For instance, the one or more seat members 808 may be coupled to the rear seat surface 804 and/or a bottom seat surface of the seat 802 via a pivoting joint. Each seat member 808 may include one or more linkages. For example, where the seat member 808 includes two linkages, the two linkages may be coupled together via a pivoting joint.

The linkage assembly 806 may include one or more rails 810. Each rail 810 may include one or more rail sections. For example, where the rail 810 includes two or more rail sections, the two or more rail sections may be telescopic. The one or more rails 810 may be coupled to the one or more seat members 808 via a pivoting joint. In this regard, the apparatus 100 may be rotatable from the upright position to the down and undeployed position, and vice versa. The one or more rails 810 may engage the apparatus 100. For instance, the one or more rails 810 may be insertable into the one or more rail channels 604. For instance, the apparatus 100 may be slideable along the one or more rails 810, such that a distance between the rear seat surface 804 and the rear surface 106 of the apparatus 100 may be increased and/or decreased. In this regard, the apparatus 100 may be adjustable from the down and undeployed position to the down and deployed position, and vice versa.

The linkage assembly 806 may include one or more cross-members 812. For example, the one or more cross-members 812 may be coupled between the one or more seat members 808 and/or between the one or more rails 810. By way of another example, the one or more cross-members 812 may be coupled to the one or more seat members 808 and the one or more rails 810 at the pivoting joint between a seat member 808 and a corresponding rail 810.

It is noted herein that the linkage assembly 806 may include two seat members 808 and two rails 810, where each seat member 808 may be coupled to a corresponding rail 810 via a pivoting joint. In addition, it is noted herein that the linkage assembly 806 may include, but is not limited to, a cross-member 812 may be coupled to a pivoting joint between a seat member 808 and a corresponding rail 810.

The rear seat surface 804 may include one or more locking components 814. The one or more locking components 814 may rotate about an axis through the rear seat surface 804, such that the one or more locking components 814 may rotate parallel (or substantially parallel) to a plane defined by the rear seat surface 804. The one or more locking components 814 may engage the recess 204 when the apparatus 100 is in the upright position.

The rear seat surface 804 may include one or more pockets 816. For example, the one or more pockets 816 may be above and/or include the one or more locking components 814. By way of another example, the one or more pockets 816 may be below the apparatus 100 when the apparatus 100 is positioned in the upright position. The pockets may be hard-plastic. The pockets may be nylon mesh and/or netting.

The paddle 112 may include one or more magnets that interact with an interior support plate and/or one or more additional magnets embedded or otherwise positioned within the top section 102 and/or the bottom section 202. In this regard, he magnets may keep the PED holder 110 in the closed position while rotating the apparatus 100 from the upright position to a down position, and vice versa.

FIGS. 9A-10C generally illustrate exemplary embodiments of the apparatus 100 including the personal electronic device holder 700, according to the inventive concepts disclosed herein.

The PED 700 may be supported when the seat 802 is in a select position. For example, the position may range from a pre-defined upright position to a reclined position up to three inches. The PED 700 may be supported at an angle relative to the top surface 104. For example, the angle may range from 116 degrees to 136 degrees.

As generally illustrated in FIGS. 9A-9D, the angle may be dependent on which of the one or more protrusions on the recess surface 300 (e.g., the one or more bumps 302 or the one or more bars 302a) is employed to support one or more edges of the PED 700, and/or where on the one or more friction surface pads 302b the one or more edges of the PED 700 are positioned.

Figure 9A:
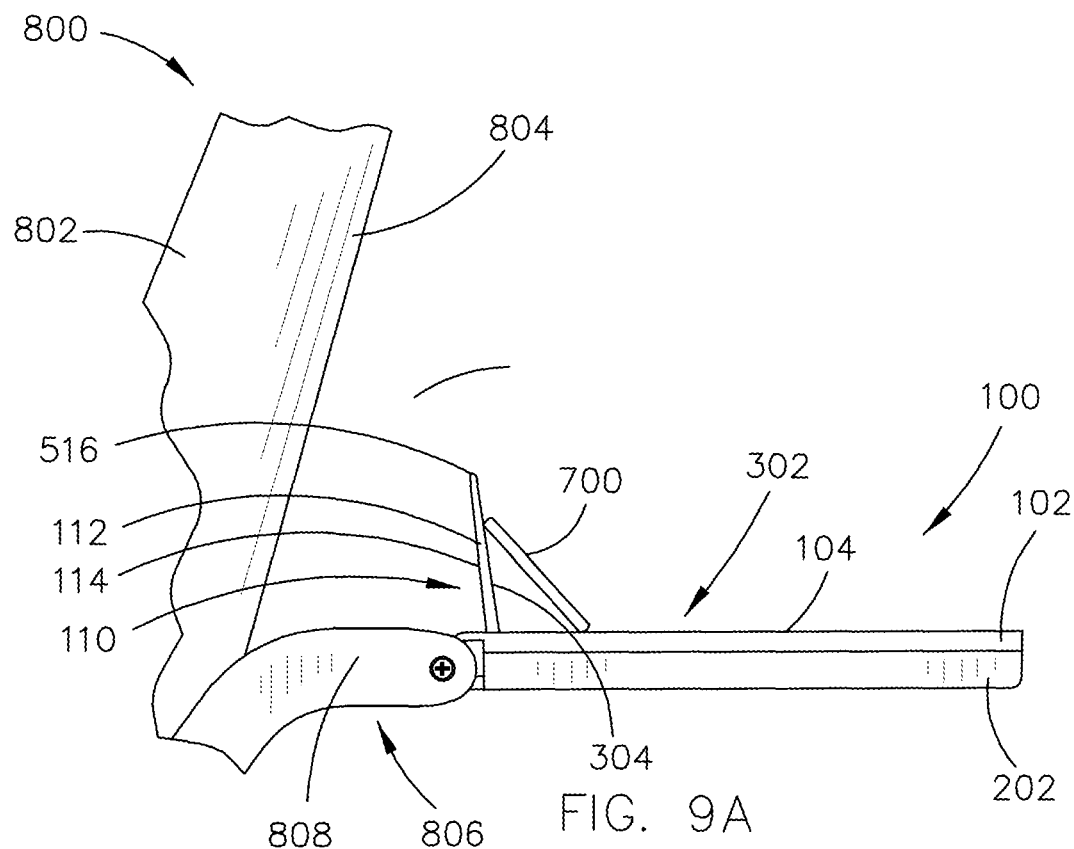
FIG. 9A is a partial side view of an exemplary embodiment of a system including an apparatus including a personal electronic device holder according to the inventive concepts disclosed herein.
Figure 9B:
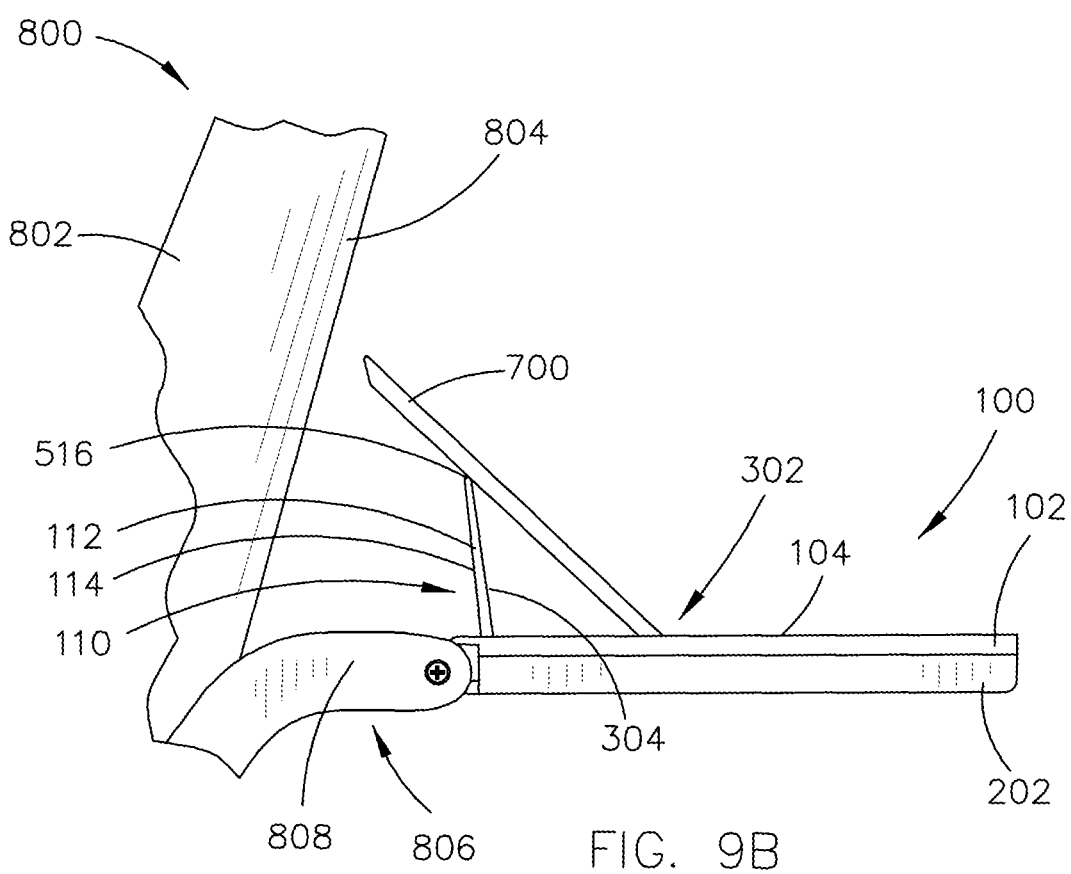
FIG. 9B is a partial side view of an exemplary embodiment of a system including an apparatus including a personal electronic device holder according to the inventive concepts disclosed herein.
Figure 9C:
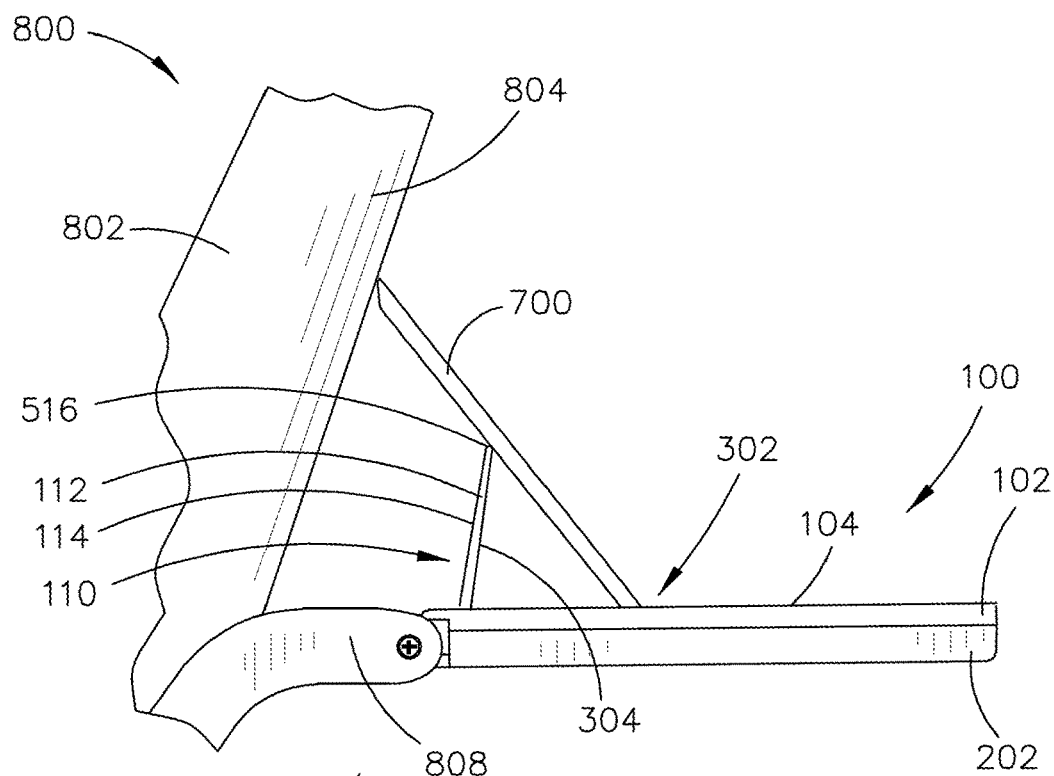
FIG. 9C is a partial side view of an exemplary embodiment of a system including an apparatus including a personal electronic device holder according to the inventive concepts disclosed herein.

As illustrated in FIGS. 9A-9C, the apparatus 100 is in the down and undeployed position. For example, as illustrated in FIG. 9A the bottom paddle surface 304 may support one or more edges of the PED 700. By way of another example, as illustrated in FIG. 9B the surface 516 of the paddle 112 may support one or more surfaces of the PED 700. By way of another example, as illustrated in FIG. 9C the rear seat surface 804 may support one or more edges of the PED 700.

Figure 9D:
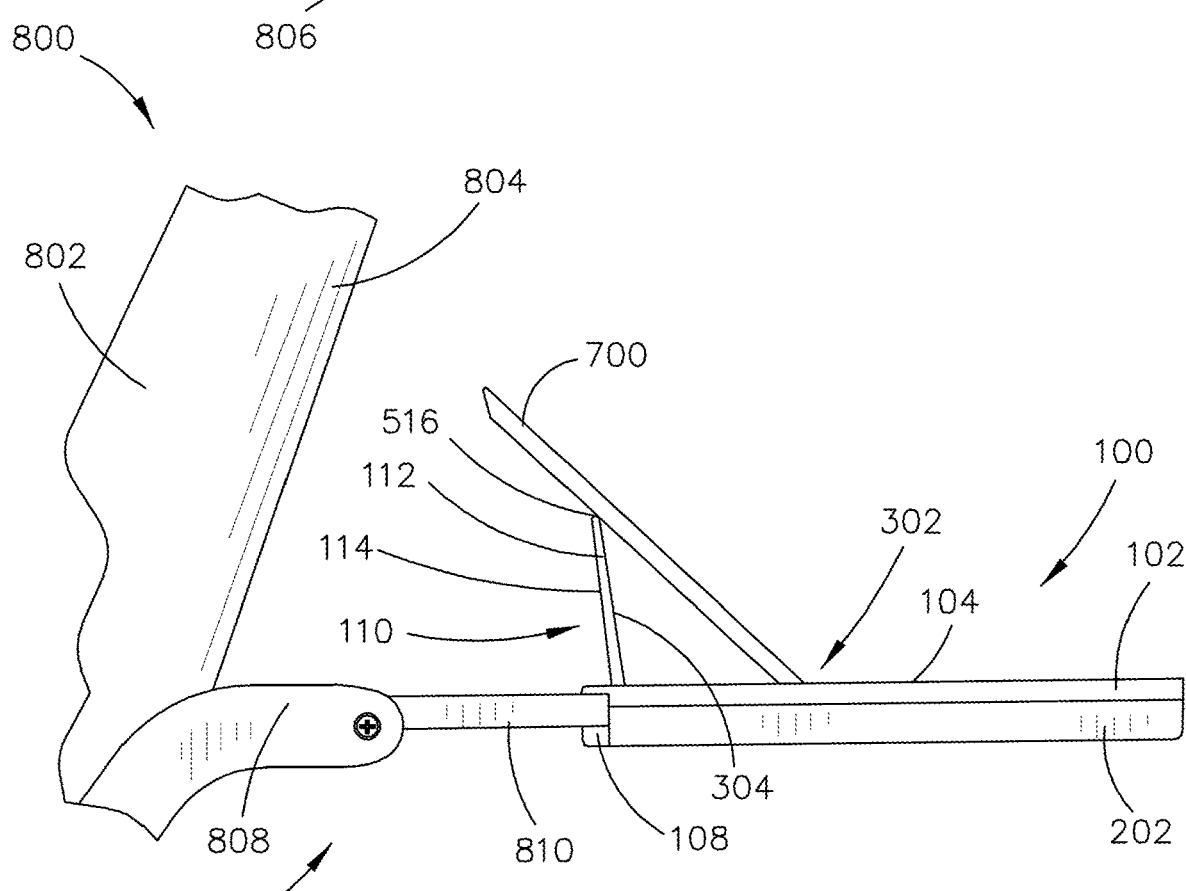
FIG. 9D is a partial side view of an exemplary embodiment of a system including an apparatus including a personal electronic device holder according to the inventive concepts disclosed herein.

It is noted herein, that where the rear seat surface 804 supports one or more edges of the PED 700, that the possible range of tilt angles may be reduced. In addition, it is noted herein that the possible range of tilt angles may be reduced where the rear seat surface 804 is reclined. As illustrated in FIG. 9D, though, the range of tilt angles may be increased when the apparatus 100 is in the down and deployed position.

Figure 10A:
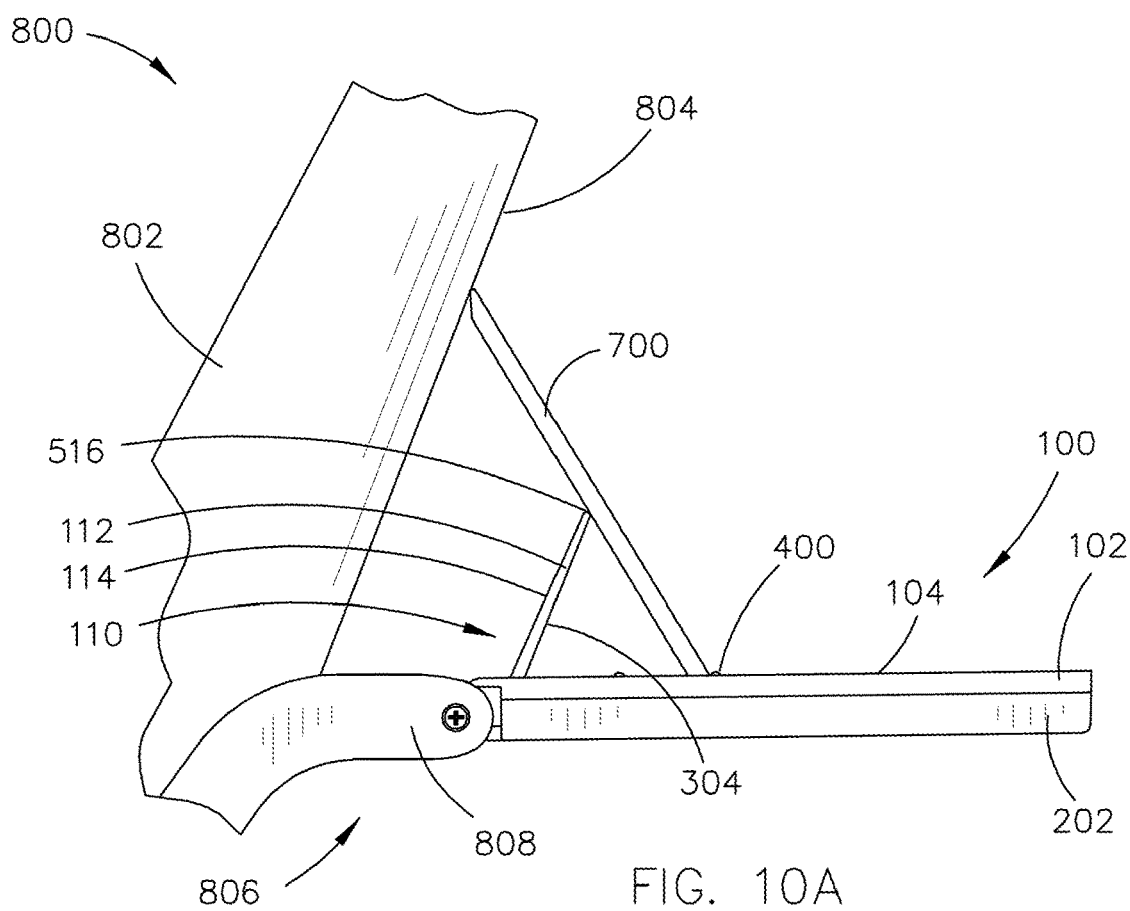
FIG. 10A is a partial side view of an exemplary embodiment of a system including an apparatus including a personal electronic device holder according to the inventive concepts disclosed herein.
Figure 10B:
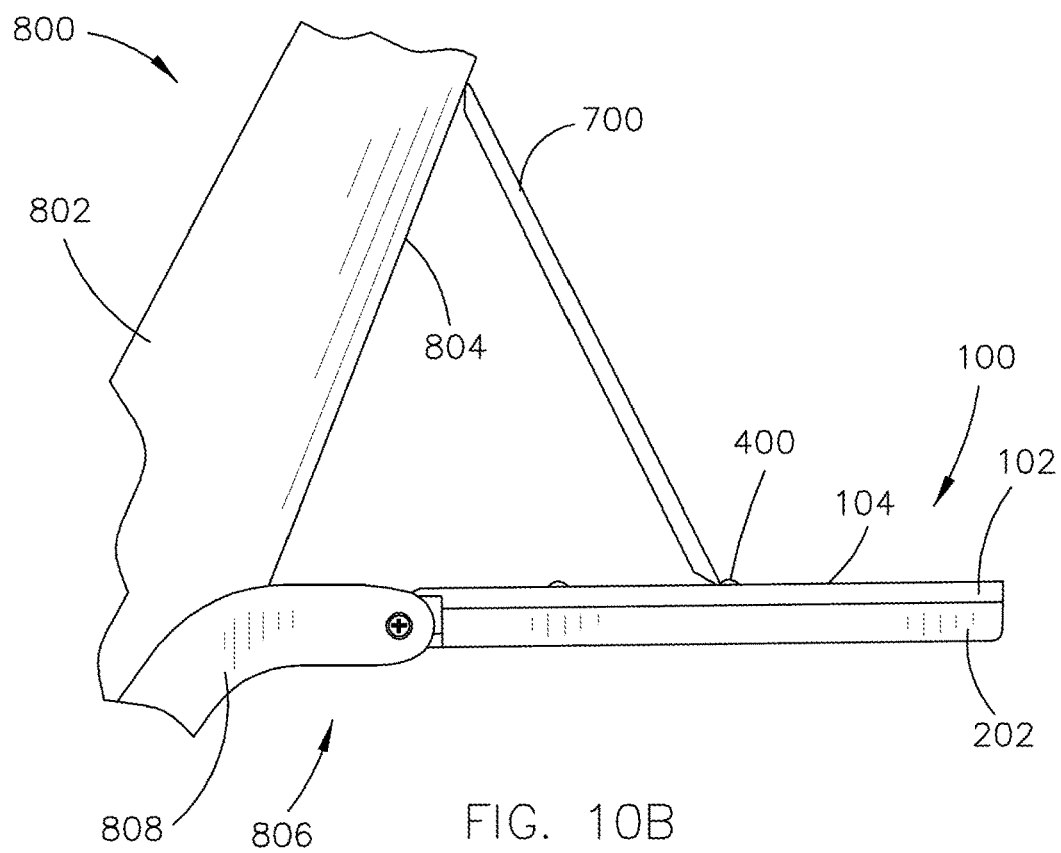
FIG. 10B is a partial side view of an exemplary embodiment of a system including an apparatus including a personal electronic device holder according to the inventive concepts disclosed herein.
Figure 10C:
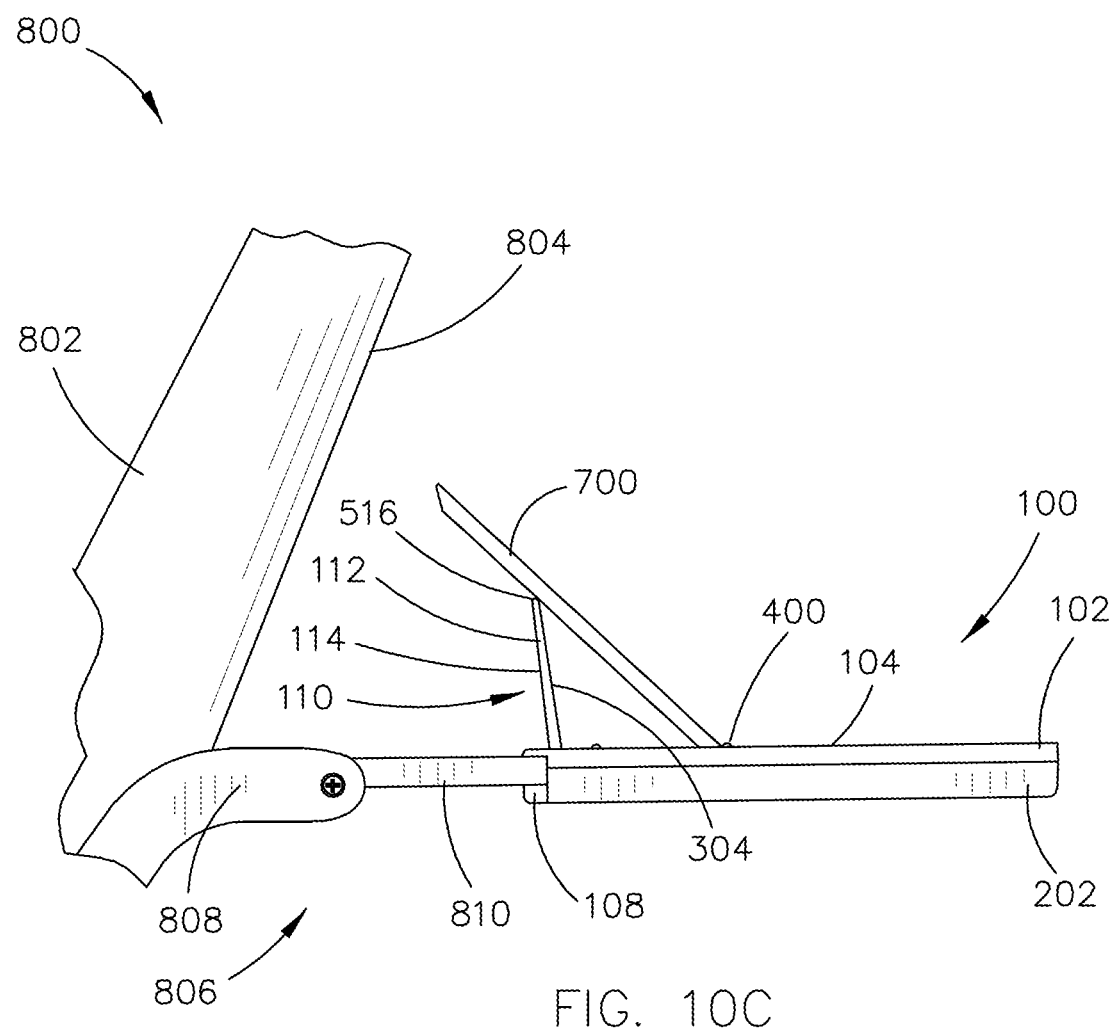
FIG. 10C is a partial side view of an exemplary embodiment of a system including an apparatus including a personal electronic device holder according to the inventive concepts disclosed herein.

As generally illustrated in FIGS. 10A-10C, the PED 700 may be supported at an angle relative to the top surface 104, where the angle is dependent on which of the one or more protrusions on the top surface 104 (e.g., the one or more bumps 400 or the one or more bars 400a) is employed to support one or more edges of the PED 700, and/or where on the one or more friction surface pads 400b the one or more edges of the PED 700 are positioned.

As illustrated in FIGS. 10A and 10B, the apparatus 100 is in the down and undeployed position. For example, as illustrated in FIG. 10A the surface 516 of the paddle 112 may support one or more surfaces of the PED 700 and the rear seat surface 804 may support one or more edges of the PED 700. By way of another example, as illustrated in FIG. 9B, only the rear seat surface 804 may support one or more edges of the PED 700, as the surface 516 of the paddle 112 As illustrated in FIG. 10C, where the apparatus 100 is in the down and deployed position, only the surface 516 of the paddle 112 may support one or more surfaces of the PED 700.

As will be appreciated from the above, embodiments of the inventive concepts disclosed herein are directed to an apparatus including an aircraft cabin personal electronic device holder. More particularly, embodiments of the inventive concepts disclosed herein are directed to an apparatus including an apparatus including an aircraft cabin personal electronic device holder, where the personal electronic device holder may be configured to be self-closing and may be configured to hold a personal electronic device in place.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An apparatus for an aircraft cabin, comprising:
    a body, comprising:
        a top section including a top surface;
        a bottom section;
        a cavity defined by a bottom interior surface of the top section and a top interior surface of the bottom section;
        a recess, the recess being defined within a top surface perimeter of the top surface, the recess including a recess surface and a recess perimeter contained within the top surface perimeter such that an entirety of the recess perimeter is surrounded by at least a portion of the top surface, the recess surface including a plurality of recess protrusions configured to support a personal electronic device;
        a sloped surface between the top surface and the recess surface; and
        one or more rail channels configured to receive one or more rails of at least one linkage assembly, the body being couplable to a surface within the aircraft cabin via the at least one linkage assembly; and
    a personal electronic device holder, comprising:
        a paddle located opposite the sloped surface within the recess, an entirety of the paddle being positioned within the recess perimeter and including a paddle perimeter dimensioned to fit within the recess perimeter when the personal electronic device holder is in a closed position, the paddle configured to support the personal electronic device when the personal electronic device holder is in an open position;
        at least one hinge coupler coupled to the paddle within the recess, the at least one hinge coupler and the paddle coupled to the body within the recess, the at least one hinge coupler positioned within the recess perimeter, the personal electronic device holder configured to rotate about an axis through the at least one hinge coupler between at least the closed position and the open position; and
        a tab coupled to the at least one hinge coupler, the tab inserted within the cavity, the tab set at an angle relative to an orientation of the paddle, the tab configured to prevent rotation of the personal electronic device holder in a selected direction when the tab makes contact with the bottom interior surface of the top section.

2. The apparatus in claim 1, the plurality of recess protrusions including a first row of one or more recess protrusions and at least an additional row of one or more recess protrusions, the one or more recess protrusions within the first row arranged in an offset pattern relative to the one or more recess protrusions within the additional row.

3. The apparatus in claim 1, the plurality of recess protrusions including a plurality of dome-shaped recess protrusions.

4. The apparatus in claim 1, the plurality of recess protrusions including a plurality of bar-shaped recess protrusions.

5. The apparatus in claim 1, the paddle perimeter and the recess perimeter each being a trapezoidal-shaped perimeter.

6. The apparatus in claim 1, the paddle including a sloped side that conforms with the sloped surface between the top surface and the recess surface.

7. The apparatus in claim 1, the paddle including a top paddle surface configured to be flush with the top surface of the body when the personal electronic device holder is in the closed position.

8. The apparatus in claim 1, the paddle including one or more contact points on a bottom paddle surface, the one or more contact points configured to engage one or more edges of the personal electronic device.

9. The apparatus in claim 1, the body comprising:
    a spring-damper assembly, the at least one hinge coupler coupled to the spring-damper assembly, the spring-damper assembly configured to return the personal electronic device holder to the closed position when the paddle is not supporting the personal electronic device.

10. The apparatus in claim 9, the spring-damper assembly comprising:
    a torsion spring configured to engage a surface of the paddle; and
    a geared rotary damper configured to engage an axle inserted into the at least one hinge coupler via a gear.

11. The apparatus in claim 1, the body comprising at least one hinge coupled to the at least one hinge coupler.

12. The apparatus in claim 11, the at least one hinge including at least one friction hinge or at least one torque hinge configured to hold the personal electronic device holder in at least one of the closed position or the open position.

13. The apparatus in claim 11, the at least one hinge including at least one self-closing hinge configured to return the paddle to the closed position when the paddle is not supporting the personal electronic device.

14. The apparatus in claim 11, the at least one hinge including at least one angle-limiting hinge configured to limit a range of angle rotation of the personal electronic device holder.

15. The apparatus in claim 1, the recess in the top surface being a first recess, the top surface including an additional recess configured to receive a lifting tool, the lifting tool configured to engage and rotate the personal electronic device holder at least between the closed position and the open position.

16. The apparatus in claim 1, the top surface including a plurality of top surface protrusions proximate to a first side and an additional side of the recess, the plurality of top surface protrusions configured to support a personal electronic device.

17. The apparatus in claim 16, the plurality of top surface protrusions including a first row of one or more top surface protrusions and at least an additional row of one or more top surface protrusions, the one or more top surface protrusions within the first row arranged in an offset pattern relative to the one or more top surface protrusions within the additional row.

18. The apparatus in claim 16, the plurality of top surface protrusions including a plurality of dome-shaped top surface protrusions.

19. The apparatus in claim 16, the plurality of top surface protrusions including a plurality of bar-shaped top surface protrusions.

20. The apparatus in claim 1, the surface within the aircraft cabin including at least one of a rear seat surface or a bottom seat surface of a seat in the aircraft cabin.

21. The apparatus in claim 1, the recess surface including a plurality of recess friction contact pads configured to support a personal electronic device.

22. The apparatus in claim 1, the top surface including a plurality of top surface friction contact pads proximate to a first side and an additional side of the recess, the plurality of top surface friction contact pads configured to support a personal electronic device.

23. An apparatus for an aircraft cabin, comprising:
   a body, comprising:
      a top section including a top surface;
      a bottom section;
      a cavity defined by a bottom interior surface of the top section and a top interior surface of the bottom section;
      a recess, the recess being defined within a top surface perimeter of the top surface, the recess including a recess surface and a recess perimeter contained within the top surface perimeter such that an entirety of the recess perimeter is surrounded by at least a portion of the top surface, the recess surface including a plurality of recess friction contact pads configured to support a personal electronic device;
      a sloped surface between the top surface and the recess surface; and
      one or more rail channels configured to receive one or more rails of at least one linkage assembly, the body being couplable to a surface within the aircraft cabin via the at least one linkage assembly; and
   a personal electronic device holder, comprising:
      a paddle located opposite the sloped surface within the recess, an entirety of the paddle being positioned within the recess perimeter and including a paddle perimeter dimensioned to fit within the recess perimeter when the personal electronic device holder is in a closed position, the paddle configured to support the personal electronic device when the personal electronic device holder is in an open position;
      at least one hinge coupler coupled to the paddle within the recess, the at least one hinge coupler and the paddle coupled to the body within the recess, the at least one hinge coupler positioned within the recess perimeter, the personal electronic device holder configured to rotate about an axis through the at least one hinge coupler between at least the closed position and the open position; and
      a tab coupled to the at least one hinge coupler, the tab inserted within the cavity, the tab set at an angle relative to an orientation of the paddle, the tab configured to prevent rotation of the personal electronic device holder in a selected direction when the tab makes contact with the bottom interior surface of the top section.

24. The apparatus in claim 23, the top surface including a plurality of top surface friction contact pads proximate to a first side and an additional side of the recess, the plurality of top surface friction contact pads configured to support a personal electronic device.

* * * * *